United States Patent
Wong et al.

(10) Patent No.: US 11,979,616 B1
(45) Date of Patent: May 7, 2024

(54) MANAGING REMOTE ACCESS TO IMAGE CAPTURE DEVICES

(71) Applicant: SimpliSafe, Inc., Boston, MA (US)

(72) Inventors: Joey Wong, Foster City, CA (US); Zach Rose, Natick, MA (US); Bojan Rajkovic, Salem, MA (US); Kevin Klemm, Waltham, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/201,830

(22) Filed: May 25, 2023

Related U.S. Application Data

(60) Provisional application No. 63/441,593, filed on Jan. 27, 2023.

(51) Int. Cl.
*H04N 21/2187* (2011.01)

(52) U.S. Cl.
CPC .............................. *H04N 21/2187* (2013.01)

(58) Field of Classification Search
CPC ........................... H04N 23/66; H04N 21/2187
See application file for complete search history.

(56) References Cited

U.S. PATENT DOCUMENTS

| | | | | |
|---|---|---|---|---|
| 5,974,389 | A * | 10/1999 | Clark ..................... | G16H 10/60 705/3 |
| 2006/0072014 | A1 | 4/2006 | Geng et al. | |
| 2007/0182540 | A1 | 8/2007 | Marman | |
| 2014/0253740 | A1 * | 9/2014 | Barnwal .......... | H04N 21/47202 348/207.1 |
| 2015/0022666 | A1 * | 1/2015 | Kay ........................ | H04L 65/65 348/159 |
| 2015/0109112 | A1 | 4/2015 | Fadell et al. | |
| 2015/0304364 | A1 | 10/2015 | Wang et al. | |
| 2016/0132099 | A1 * | 5/2016 | Grabau ................. | G06F 1/3215 713/323 |
| 2017/0280112 | A1 * | 9/2017 | Siminoff ................ | G06V 20/52 |
| 2018/0019889 | A1 * | 1/2018 | Burns ................. | H04L 12/4625 |
| 2019/0082115 | A1 | 3/2019 | Takahashi et al. | |

(Continued)

FOREIGN PATENT DOCUMENTS

EP 2407944 A1 1/2012

OTHER PUBLICATIONS

U.S. Appl. No. 18/113,888, filed Feb. 24, 2023.

(Continued)

*Primary Examiner* — Padma Haliyur
(74) *Attorney, Agent, or Firm* — Pierce Atwood LLP

(57) ABSTRACT

One disclosed method involves receiving a first request to establish a first connection between a computing device and a camera, wherein the first connection is configured to allow streaming of video data from the camera to the computing device and the camera is configured to support connections with multiple remote devices at one time. A determination is made that a second connection is already established between an endpoint device and the camera, wherein the second connection is configured to allow streaming of video data from the camera to the endpoint device. Based at least in part on the first request and the second connection already being established, the second connection is terminated and the first connection is established, thus providing the computing device with access to one or more functionalities of the camera free of interference by the endpoint device.

20 Claims, 12 Drawing Sheets

(56) References Cited

U.S. PATENT DOCUMENTS

| | | |
|---|---|---|
| 2020/0226416 A1 | 7/2020 | Bapat et al. |
| 2020/0320838 A1 | 10/2020 | Trundle et al. |
| 2020/0413006 A1 | 12/2020 | Cheng |
| 2021/0274130 A1 | 9/2021 | Nodder |
| 2021/0360446 A1* | 11/2021 | Laurans .................. H04N 7/12 |
| 2022/0207972 A1 | 6/2022 | Madden et al. |

OTHER PUBLICATIONS

U.S. Appl. No. 63/441,960, filed Jan. 30, 2023.
U.S. Appl. No. 63/441,593, filed Jan. 27, 2023.
U.S. Appl. No. 17/529,332, filed Nov. 18, 2021.
"Kinesis Video Streams: Amazon Kinesis Video Streams WebRTC Developer Guide", Amazon Web Services, Inc., 2023, p. 1-61.
J. Rosenberg, "Interactive Connectivity Establishment (ICE): A Protocol for Network Address Translator (NAT) Traversal for Offer/Answer Protocols", Internet Engineering Task Force (IETF), Apr. 2010, p. 1-117.
"Firebase + WebRTC Codelab", WebRTC, Google Developers, https://webrtc.org/getting-started/firebase-rtc-codelab, retrieved from the Internet on Mar. 9, 2023.
Written Opinion of the International Preliminary Examining Authority mailed Mar. 30, 2023, for International Patent Application No. PCT/US2021/059844.

\* cited by examiner

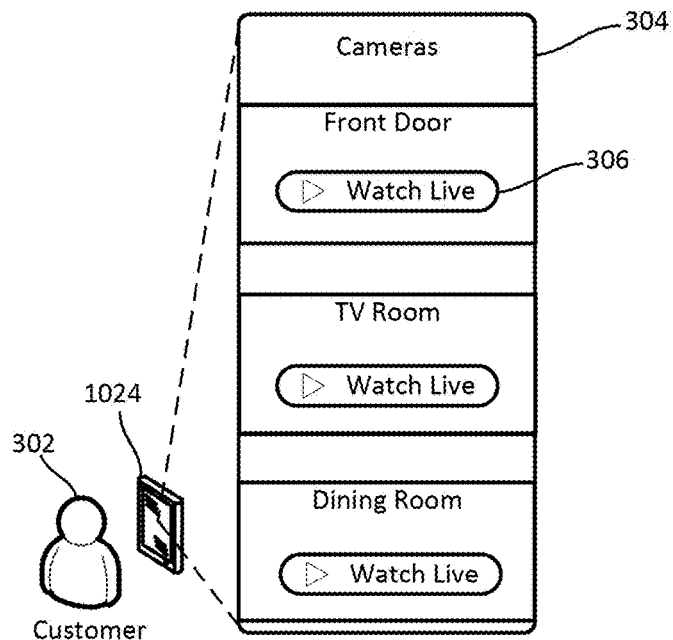
FIG. 3
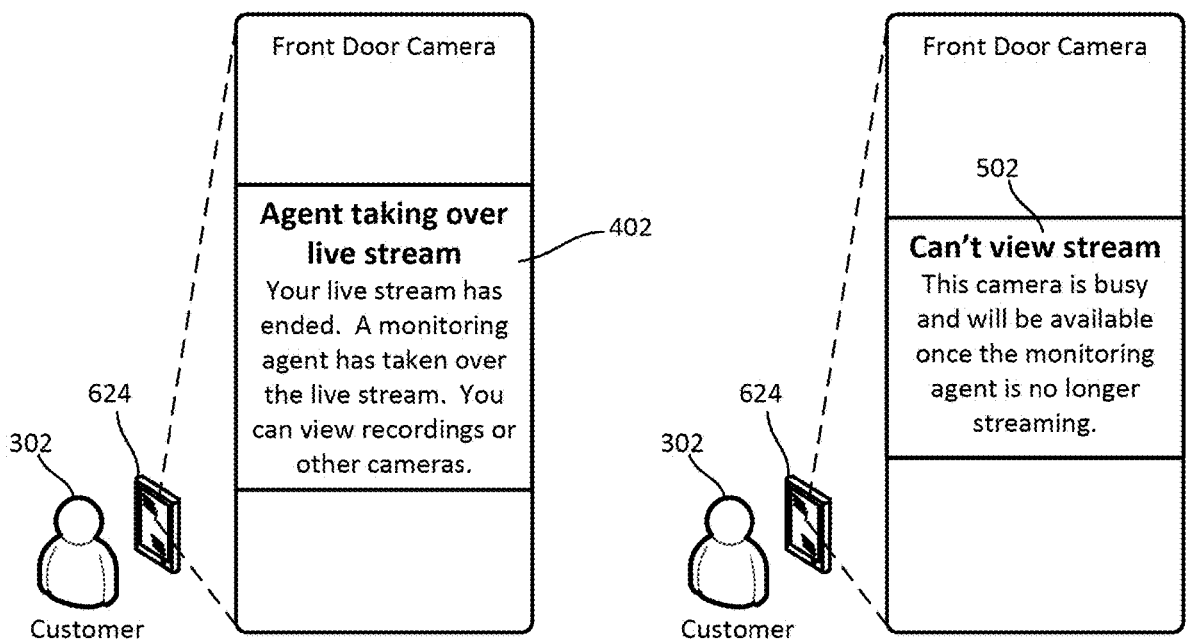
FIG. 4
FIG. 5

MANAGING REMOTE ACCESS TO IMAGE CAPTURE DEVICES

CROSS-REFERENCE TO RELATED APPLICATIONS

This application claims the benefit under 35 U.S.C. § 119(e) of U.S. Provisional Application Ser. No. 63/441,593, entitled MANAGING REMOTE ACCESS TO IMAGE CAPTURE DEVICES, filed Jan. 27, 2023, the entire contents of which are incorporated herein by reference.

BACKGROUND

Some security systems enable remote monitoring of locations using cameras and other equipment.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 3 shows a first example screen that may be displayed by a customer device to enable access to real time video feeds from a location monitored by a security system, according to some implementations of the present disclosure.

FIG. 4 shows a second example screen that may be displayed by a customer device when a monitoring agent obtains exclusive to access to a camera at a time that a customer was viewing a real time feed from that same camera, according to some implementations of the present disclosure.

FIG. 5 shows a third example screen that may be displayed by a customer device when a customer attempts to view a real time feed from a camera after a monitoring agent has obtained exclusive to that same camera, according to some implementations of the present disclosure.

SUMMARY

Figure 1:
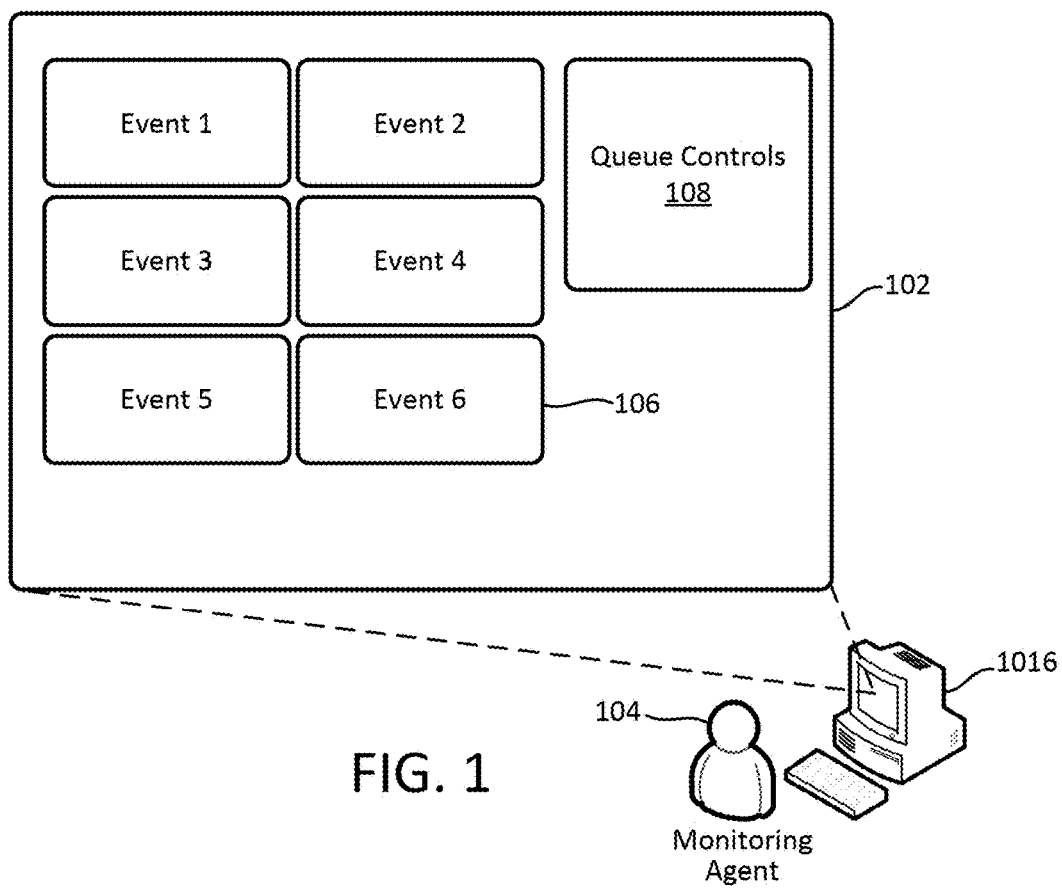
FIG. 1 shows a first example screen that may be displayed by a monitoring device to indicate certain events detected by a security system, according to some implementations of the present disclosure.

In some disclosed embodiments, a method involves receiving a first request to establish a first connection between a computing device and a camera, wherein the first connection is configured to allow streaming of video data from the camera to the computing device, the computing device is remote from the camera, and the camera is configured to support connections with multiple remote devices at one time; determining that a second connection is already established between an endpoint device and the camera, wherein the endpoint device is remote from the camera, and the second connection is configured to allow streaming of video data from the camera to the endpoint device; and based at least in part on the first request and the second connection already being established, terminating the second connection and establishing the first connection to provide the computing device with access to one or more functionalities of the camera free of interference by the endpoint device.

In other disclosed embodiments, a method involves receiving a first request to establish a first connection between an endpoint device and a camera, wherein the endpoint device is remote from the camera, and the camera is configured to support connections with multiple remote devices at one time; determining that a second connection is already established between a second computing device and the camera, wherein the second computing device is remote from the camera, and the second connection is configured to allow streaming of video data from the camera to the second computing device; and based at least in part on the first request and the second connection already being established, denying the first request so that the second computing device has access to one or more functionalities of the camera free of interference by the endpoint device.

In still other disclosed embodiments, a system includes at least one processor, and at least one computer-readable medium encoded with instructions which, when executed by the at least one processor, cause the system to receive a first request to establish a first connection between a computing device and a camera, wherein the first connection is configured to allow streaming of video data from the camera to the computing device, the computing device is remote from the camera, and the camera is configured to support connections with multiple remote devices at one time, to determine that a second connection is already established between an endpoint device and the camera, wherein the endpoint device is remote from the camera, and the second connection is configured to allow streaming of video data from the camera to the endpoint device, and to, based at least in part on the first request and the second connection already being established, terminate the second connection and establishing the first connection to provide the computing device with access to one or more functionalities of the camera free of interference by the endpoint device.

DETAILED DESCRIPTION

Existing security systems use cameras and other sensors to monitor a location for various reasons. Some such systems are configured to detect the occurrence of certain phenomena, e.g., motion and/or sound, within or around the monitored location, and are further configured to send event notifications and associated image data to a remote location for processing and/or review by human monitoring agents. Monitoring agents may review the event notifications and their associated images to ascertain whether individual event notifications raise actual security concerns or were instead generated for innocuous reasons, such as pets or other animals, visiting neighbors, trees moving in strong winds, delivery personnel, door-to-door salespeople, etc.

Offered is a system in which a monitoring agent, upon determining that a notification (e.g., an event notification) raises a potential security concern, may additionally review live video and/or audio from a location to evaluate whether the detected event raises a security concern. For example, in some implementations, the system may allow a computing device operated by the monitoring agent to establish peer-to-peer connections with one or more cameras at the location, e.g., to enable the streaming of video data and/or audio data between the monitoring agent's computing device and the camera(s). Further, in some implementations, the system may additionally preclude one or more other computing devices, e.g., a computing device operated by a customer, from establishing or maintaining peer-to-peer connections with such camera(s). Precluding such other computing device(s) from establishing peer-to-peer connections with the camera(s) may be advantageous because doing so can both (A) ensure a high-quality connection with the camera(s), and (B) enable the monitoring agent to take control of the situation without interference from the customer, such as by engaging in two-way communication with one or more suspicious individuals (e.g., via a microphone and speaker) in the vicinity of the camera(s). In some implementations, the computing device operated by the monitoring agent may be the only computing device that is permitted to establish peer-to-peer connection(s) with the camera(s), thus giving the monitoring agent exclusive access to the hardware resources of the camera(s).

Absent providing the monitoring agent with exclusive access to the camera(s), or at least access to the exclusion of a customer, the customer might also be trying to stream live video from a camera and/or communicate with the suspicious individuals, thus potentially taxing the camera's hardware resources and interfering with the ability of the monitoring agent to engage in effective two-way communication with those individuals. With respect to the taxing of hardware resources, some cameras may be unable to reliably transmit high-quality video data streams to multiple endpoints, may favor one peer-to-peer connection over another at given time, or may even freeze or otherwise stop working for extended periods of time. Such circumstances can thus potentially preclude the monitoring agent from promptly identifying a threating situation in the vicinity of the affected camera(s). With respect to the potential impact on the monitoring agent's ability to engage in two-way communication with the individual(s) in the vicinity of the camera(s), a customer who has observed an intruder at the monitored location may be under a great deal of stress and/or may be extremely upset, and may therefore have difficulty engaging in a dialog with the individual(s) in a manner that is likely to de-escalate the situation. By allowing the monitoring agent to have control of a camera's speaker to the exclusion of the customer, the monitoring agent can be in a better position to engage in a meaningful dialog with the individual(s), e.g., without having to "talk over" the customer. As described below, a customer may be notified when a monitoring agent has taken control of one or more cameras to the exclusion of the customer, so the customer understands the reason why the customer has suddenly lost a camera connection or is unable to establish such a connection.

FIG. 1 shows an example screen 102 that may be presented on a computer or other monitoring device 1016 (described below in connection with FIG. 10) within a security system 600 (shown in FIG. 6) that is configured in accordance with certain aspects of the present disclosure. As shown, the monitoring device 1016 may be operated by a monitoring agent 104, and the screen 102 may include a set of event windows 106 corresponding to respective events that are currently in the agent's queue for review. In some implementations, for example, the individual windows 106 may be configured to play back recorded video clips corresponding to respective events that were detected at various monitored locations. As shown in FIG. 1, in some configurations, the screen 102 may include a queue controls interface 108 that includes one or more user interface (UI) elements to allow the monitoring agent 104 to control various aspects of that agent's queue, such as a maximum number of notifications that can be added to the agent's queue for presentation in respective event windows 106. In some implementations, event notifications may be distributed to individual monitoring agents 104, who are included in a pool of available monitoring agents 104, so that all of the available monitoring agents 104 have roughly the same number of events in their review queue at a given time.

A camera 604 of a security system 600 (see FIG. 6) may be triggered by a person coming within the field of view (FOV) of the camera 604 and may record a video signal for a period of time, e.g., until the person has left the camera's FOV. A video clip for such an occurrence may be stored (e.g., within the image data store 1004 shown in FIG. 10) and associated with an event. A notification of that event may then be added to the review queue for a monitoring agent 104, e.g., by presenting the recorded video clip for the detected event within one of the event windows 106 shown in FIG. 1.

Upon reviewing one of the event windows 106, e.g., by viewing a recorded video clip corresponding to detected motion, the monitoring agent 104 may determine that no potential security threat exists and provide an input instructing monitoring device to review the event notification from the agent's queue, thus freeing up the corresponding event window 106 to display another event notification. Alternatively, upon reviewing one of the event windows 106, e.g., by viewing a recorded video clip corresponding to detected motion, the monitoring agent 104 may determine that a potential threat or other security concern exists and decide that reviewing live video and/or audio from the monitored location 602 at which the video clip was recorded may help resolve the concern. The monitoring agent 104 may access live video and/or audio from a monitored location, for example, by selecting the event window 106 in which the recorded video in question is being played or otherwise displayed. In response to such a selection, the monitoring device 1016 may begin to receive live video and/or audio streamed from one or more cameras at the monitored location 602. In some implementations, for example, one or more peer-to-peer connections may be established between one or more cameras 604 (show in FIG. 6) at the monitored location and the monitoring device 1016, e.g., using web real-time communication (WebRTC) functionality of a browser on the monitoring device 1016, to enable the streaming of video data and/or audio data between such camera(s) and the monitoring device 1016. An example process for securely establishing a peer-to-peer connection between the monitoring device 1016 and a camera 604 is described below in connection with FIGS. 12 and 13.

Figure 2:
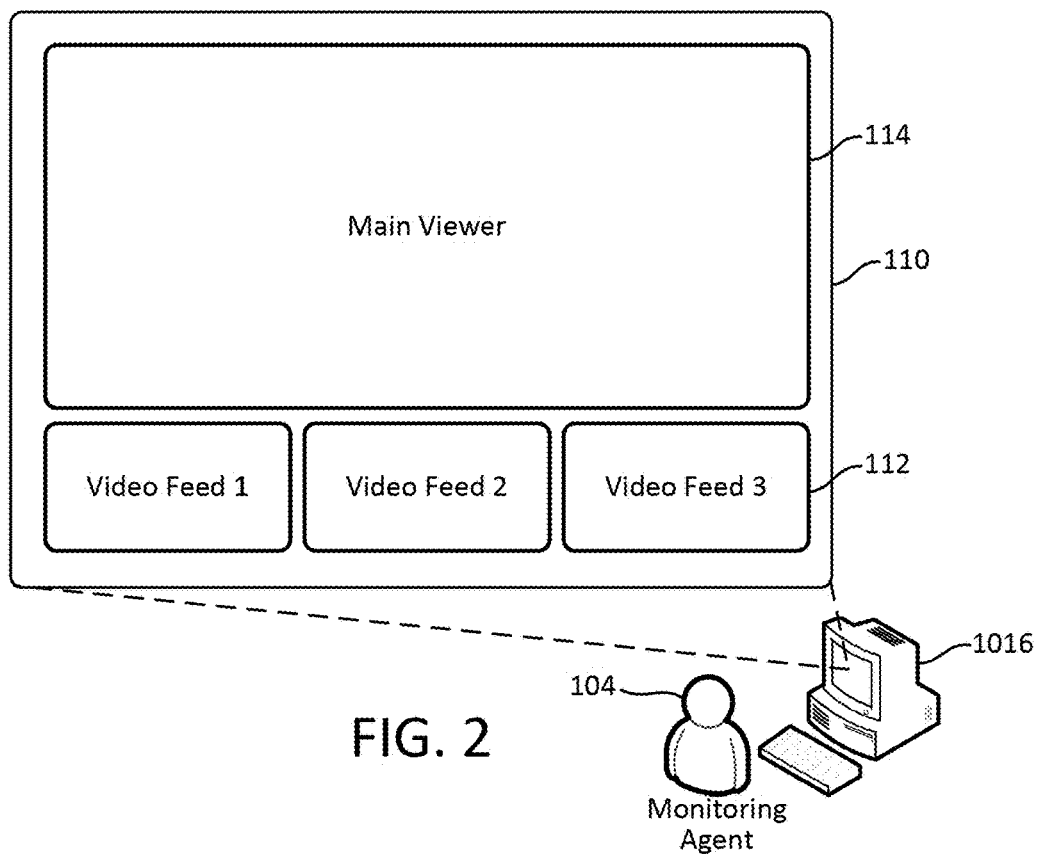
FIG. 2 shows a second example screen that may be displayed by a monitoring device to present real time video feeds from a location monitored by a security system, according to some implementations of the present disclosure.

FIG. 2 shows an example screen 110 that may be presented by the monitoring device 1016 in response to selection of one of the event windows 106 shown in FIG. 1. In the illustrated example, the screen 110 includes three video feed windows 112 configured to display streamed video from three different cameras 604 at the monitored location 602 corresponding to the selected event window 106. Although not illustrated in FIG. 2, controls may additionally or alternatively be provided to allow the monitoring agent 104 to listen to streamed audio from the corresponding camera(s) 604 as well as to speak into a microphone so as to cause one or more speakers of such camera(s) 604 to output audio representing to the monitoring agent's voice. In the illustrated example, the screen 110 also includes a larger, main viewer window 114 in which the streamed video for one of the video feed windows 112 may optionally be played, thus making it easier for the monitoring agent 104 to see the content of the video. In some implementations, the monitoring agent 104 may cause the streamed video from a particular camera 604 to be played in the main viewer window 114 by selecting the video feed window 112 for that camera, e.g., by clicking on it.

The monitoring agent 104 may take an appropriate action based on a review of the live video and/or audio from the camera(s) 604. If the monitoring agent 104 determines that a threat or other security issue may exist, the monitoring agent 104 may trigger an alarm, notify the police, verbally communicate with one or more individuals at the monitored location 602, e.g., via a speaker on a camera 604, and/or take any of a number of other possible remedial actions. If the monitoring agent 104 determines that no security issue exists, the monitoring agent 104 may instead mark the event notification as clear, thus causing it to be removed from that agent's queue.

As shown in FIG. 3, in some implementations, the security system 600 may further be configured to allow a customer 302 to operate a smartphone or other client, endpoint or customer device 624 (shown in FIG. 6) to stream live video and/or audio from one or more of the cameras(s) 604 at the monitored location 602. For example, as illustrated, the customer device 624 may present a screen 304 including user interface elements 306 corresponding to respective cameras 604 at the monitored location 602, and may be configured so that selection of one of those user interface elements 306 causes a peer-to-peer connection (e.g., using the WebRTC functionality of a browser on the customer device 624) to be established between the customer device 624 and the corresponding camera 604. An example process for securely establishing a peer-to-peer connection between the customer device 624 and a camera 604 is described below in connection with FIGS. 12 and 13.

As shown in FIG. 4, in the event that the customer 302 is viewing a live feed from a camera 604 at a time that a monitoring agent 104 has initiated a live stream with that same camera 604, the customer device 624 may terminate the connection with the camera 604 and display a message 402 indicating that the monitoring agent 104 has taken over the camera feed. Additionally, as shown in FIG. 5, in the event that the customer 302 attempts to initiate a live stream with a camera 604 that is already being used by a monitoring agent 104, the customer device 624 may refrain from streaming data from the camera 604 and instead display a message 502 indicating that a live stream with that camera 604 cannot be provided because a monitoring agent 104 is currently using the camera 604. Detailed descriptions of example processes that may be employed by a camera 604 to cause a customer device 624 to operate as described above in connection with FIGS. 3-5 are provided below in connection with FIGS. 14-16.

As noted above, precluding the customer device 624 from establishing and/or maintaining a live stream connection with a camera 604 when a monitoring agent 104 is actively using that camera 604 to resolve a potential security issue can provide significant advantages, such as allowing the monitoring agent to take full advantage of the camera's hardware capabilities and precluding the customer 302 from interfering with communications between the monitoring agent 104 and one or more individuals in the vicinity of the camera 604 when the monitoring agent 104 is attempting to evaluate and/or de-escalate a potentially threatening situation.

Figure 6:
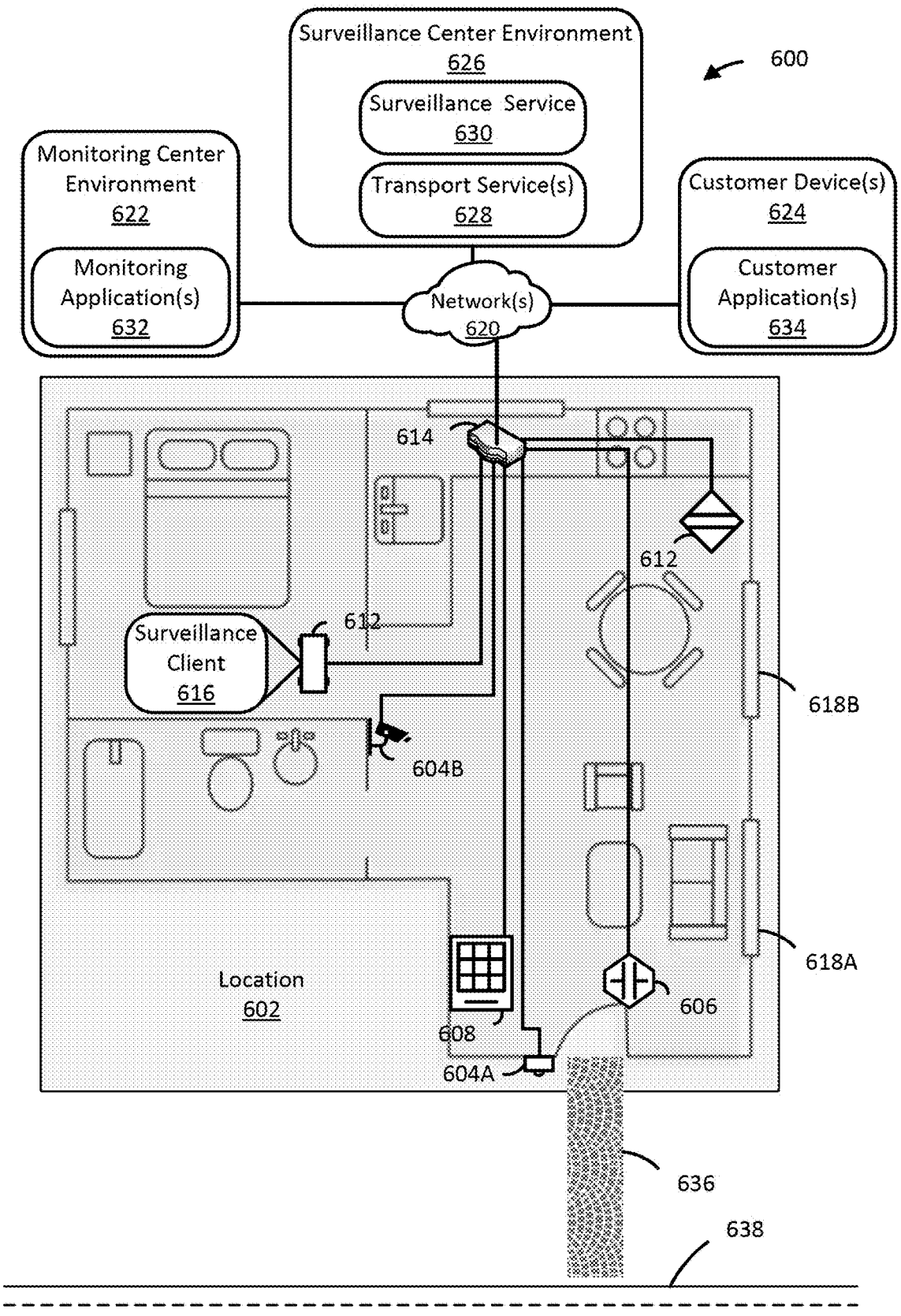
FIG. 6 shows an example implementation of a security system, according to some implementations of the present disclosure.

FIG. 6 is a schematic diagram of an example security system 600 with which various aspects of the present disclosure may be employed. As shown, in some implementations, the security system 600 may include a plurality of monitored locations 602 (only one of which is illustrated in FIG. 6), a monitoring center environment 622, a surveillance center environment 626, one or more customer devices 624, and one or more communication networks 620. The monitored location 602, the monitoring center environment 622, the surveillance center environment 626, the one or more customer device(s) 624, and the communication network(s) 620 may each include one or more computing devices (e.g., as described below with reference to FIG. 17). The customer device(s) 624 may include one or more customer applications 634, e.g., as applications hosted on or otherwise accessible by the customer device(s) 624. In some implementations, the customer applications 634 may be embodied as web applications that can be accessed via browsers of the customer device(s) 624. The monitoring center environment 622 may include one or more monitoring applications 632, e.g., as applications hosted on or otherwise accessible to computing devices within the monitoring center environment 622. In some implementations, the monitoring applications 632 may be embodied as web applications that can be accessed via browsers of computing devices operated by monitoring agents 104 within the monitoring center environment 622. The surveillance center environment 626 may include a surveillance service 630 and one or more transport services 628.

As shown in FIG. 6, the monitored location 602 may include one or more image capture devices (e.g., cameras 604A and 604B), one or more contact sensor assemblies (e.g., contact sensor assembly 606), one or more keypads (e.g., keypad 608), one or more motion sensor assemblies (e.g., motion sensor assembly 610), a base station 612, and a router 614. As illustrated, the base station 612 may host a surveillance client 616.

In some implementations, the router 614 may be a wireless router that is configured to communicate with the devices disposed at the monitored location 602 (e.g., devices 604A, 604B, 606, 608, 610, and 612) via communications that comport with a communications standard such as any of the various Institute of Electrical and Electronics Engineers (IEEE) 802.11 standards. As illustrated in FIG. 6, the router 614 may also be configured to communicate with the network(s) 620. In some implementations, the router 614 may implement a local area network (LAN) within and proximate to the monitored location 602. In other implementations, other types of networking technologies may additionally or alternatively be used within the monitored location 602. For instance, in some implementations, the base station 612 may receive and forward communication packets transmitted by one or both of the cameras 604A, 604B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 620 may include one or more public and/or private networks that support, for example, internet protocol (IP) communications. The network(s) 620 may include, for example, one or more LANs, one or more PANs, and/or one or more wide area networks (WANs). LANs that may be employed include wired or wireless networks that support various LAN standards, such as a version of IEEE 802.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CDMA), Global System for Mobiles (GSM), or the like. Regardless of the particular networking technology that is employed, the network(s) 620 may connect and enable data communication among the components within the monitored location 602, the monitoring center environment 622, the surveillance center environment 626, and the customer device(s) 624. In at least some implementations, both the monitoring center environment 622 and the surveillance center environment 626 may include networking components (e.g., similar to the router 614) that are configured to communicate with the network(s) 620 and various computing devices within those environments.

The surveillance center environment 626 may include physical space, communications, cooling, and power infrastructure to support networked operation of a large number of computing devices. For instance, the infrastructure of the surveillance center environment 626 may include rack space into which the computing devices may be installed, uninterruptible power supplies, cooling plenum and equipment, and networking devices. The surveillance center environment 626 may be dedicated to the security system 600, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 6, the surveillance center environment 626 may be configured to host the surveillance service 630 and the transport service(s) 628.

The monitoring center environment 622 may include a plurality of computing devices (e.g., desktop computers) and network equipment (e.g., one or more routers) that enable communication between the computing devices and the network(s) 620. The customer device(s) 624 may each include a personal computing device (e.g., a desktop computer, laptop, tablet, smartphone, or the like) and network equipment (e.g., a router, cellular modem, cellular radio, or the like). As illustrated in FIG. 6, the monitoring center environment 622 may be configured to host the monitoring application(s) 632 and the customer device(s) 624 may be configured to host the customer application(s) 634.

The devices 604A, 604B, 606, and 610 may be configured to acquire analog signals via sensors incorporated into the devices, generate digital sensor data based on the acquired signals, and communicate (e.g., via a wireless link with the router 614) the sensor data to the base station 612. The types of sensor data generated and communicated by these devices may vary depending on the characteristics of the sensors they include. For instance, the image capture devices or cameras 604A and 604B may acquire ambient light, generate one or more frames of image data based on the acquired light, and communicate the frame(s) to the base station 612, although the pixel resolution and frame rate may vary depending on the capabilities of the devices. In some implementations, the cameras 604A and 604B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 612. In the example shown in FIG. 6, the camera 604A has a field of view (FOV) that originates proximal to a front door of the monitored location 602 and can acquire images of a walkway 636, a road 638, and a space between the monitored location 602 and the road 64A0. The camera 604B, on the other hand, has an FOV that originates proximal to a bathroom of the monitored location 602 and can acquire images of a living room and dining area of the monitored location 602. The camera 604B may further acquire images of outdoor areas beyond the monitored location 602, e.g., through windows 618A and 618B on the right-hand side of the monitored location 602.

Individual sensor assemblies deployed at the monitored location 602, e.g., the contact sensor assembly 606 shown in FIG. 6, may include, for example, a sensor that can detect the presence of a magnetic field generated by a magnet when the magnet is proximal to the sensor. When the magnetic field is present, the contact sensor assembly 606 may generate Boolean sensor data specifying a closed state of a window, door, etc. When the magnetic field is absent, the contact sensor assembly 606 may instead generate Boolean sensor data specifying an open state of the window, door, etc. In either case, the contact sensor assembly 606 shown in FIG. 6 may communicate sensor data indicating whether the front door of the monitored location 602 is open or closed to the base station 612.

Individual motion sensor assemblies that are deployed at the monitored location 602, e.g., the motion sensor assembly 610 shown in FIG. 6, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 610 may generate Boolean sensor data specifying an alert state. When the sensor does not detect a change in the reflected pressure waves, e.g., because no objects are moving within the monitored space, the motion sensor assembly 610 may instead generate Boolean sensor data specifying a still state. In either case, the motion sensor assembly 610 may communicate the sensor data to the base station 612. It should be noted that the specific sensing modalities described above are not limiting to the present disclosure. For instance, as but one example of an alternative implementation, the motion sensor assembly 610 may instead (or additionally) base its operation on the detection of changes in reflected electromagnetic waves.

While particular types sensors are described above, it should be appreciated that other types of sensors may additionally or alternatively be employed within the monitored location 602 to detect the presence and/or movement of humans, or other conditions of interest, such as smoke, elevated carbon dioxide levels, water accumulation, etc., and to communicate data indicative of such conditions to the base station 612. For instance, although not illustrated in FIG. 6, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 612 may additionally or alternatively be configured to identify particular signal profiles indicative of particular conditions, such as sound profiles indicative of breaking glass, footsteps, coughing, etc.

The keypad 608 shown in FIG. 6 may be configured to interact with a user and interoperate with the other devices disposed in the monitored location 602 in response to such interactions. For instance, in some examples, the keypad 608 may be configured to receive input from a user that specifies one or more commands and to communicate the specified commands to one or more addressed devices and/or processes, e.g., one or more of the devices disposed in the monitored location 602, the monitoring application(s) 632, and/or the surveillance service 630. The communicated commands may include, for example, codes that authenticate the user as a resident of the monitored location 602 and/or codes that request activation or deactivation of one or more of the devices disposed in the monitored location 602. In some implementations, the keypad 608 may include a user interface (e.g., a tactile interface, such as a set of physical buttons or a set of "soft" buttons on a touchscreen) configured to interact with a user (e.g., receive input from and/or render output to the user). Further, in some implementations, the keypad 608 may receive responses to the communicated commands and render such responses via the user interface as visual or audio output.

The base station 612 shown in FIG. 6 may be configured to interoperate with other security system devices disposed at the monitored location 602 to provide local command and control and/or store-and-forward functionality via execution of the surveillance client 616. To implement local command and control functionality, the base station 612 may execute a variety of programmatic operations through execution of the surveillance client 616 in response to various events. Examples of such events include reception of commands from the keypad 608, reception of commands from one of the monitoring application(s) 632 or the customer application 634 via the network(s) 620, and detection of the occurrence of a scheduled event. The programmatic operations executed by the base station 612 via execution of the surveillance client 616 in response to events may include, for example, activation or deactivation of one or more of the devices 604A, 604B, 606, 608, and 610; sounding of an alarm; reporting an event to the surveillance service 630; and/or communicating "location data" to one or more of the transport service(s) 628. Such location data may include, for example, data specifying sensor readings (sensor data), image data acquired by one or more cameras 604, configuration data of one or more of the devices disposed at the monitored location 602, commands input and received from a user (e.g., via the keypad 608 or a customer application 634), or data derived from one or more of the foregoing data types (e.g., filtered sensor data, filtered image data, summarizations of sensor data, event data specifying an event detected at the monitored location 602 via the sensor data, etc.).

In some implementations, to implement store-and-forward functionality, the base station 612, through execution of the surveillance client 616, may receive sensor data, package the data for transport, and store the packaged sensor data in local memory for subsequent communication. Such communication of the packaged sensor data may include, for example, transmission of the packaged sensor data as a payload of a message to one or more of the transport service(s) 628 when a communication link to the transport service(s) 628 via the network(s) 620 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 628 of the surveillance center environment 626 may be configured to receive messages from monitored locations (e.g., the monitored location 602), parse the messages to extract payloads included therein, and store the payloads and/or data derived from the payloads within one or more data stores hosted in the surveillance center environment 626. Examples of such data stores are described below in connection with FIG. 10. In some implementations, the transport service(s) 628 may expose and implement one or more application programming interfaces (APIs) that are configured to receive, process, and respond to calls from base stations (e.g., the base station 612) via the network(s) 620. Individual instances of transport service(s) 628 may be associated with and specific to certain manufactures and/or models of location-based monitoring equipment (e.g., SIMPLISAFE equipment, RING equipment, etc.).

The API(s) of the transport service(s) 628 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 628. In some implementations, portions of the HTTP communications may be encrypted to increase security. Alternatively (or additionally), in some implementations, one or more APIs of the transport service(s) 628 may be implemented as a .NET web API that responds to HTTP posts to particular URLs. Alternatively (or additionally), in some implementations, one or more APIs of the transport service(s) 628 may be implemented using simple file transfer protocol commands. Thus, the API(s) of the transport service(s) 628 are not limited to any particular implementation.

The surveillance service 630 within the surveillance center environment 626 may be configured to control the overall logical setup and operation of the security system 600. As such, the surveillance service 630 may communicate and interoperate with the transport service(s) 628, the monitoring application(s) 632, the customer application(s) 634, and the various devices disposed at the monitored location 602 via the network(s) 620. In some implementations, the surveillance service 630 may be configured to monitor data from a variety of sources for events (e.g., a break-in event) and, when an event is detected, notify one or more of the monitoring applications 632 and/or the customer application(s) 634 of the event.

In some implementations, the surveillance service 630 may additionally be configured to maintain state information regarding the monitored location 602. Such state information may indicate, for example, whether the monitored location 602 is safe or under threat. In some implementations, the surveillance service 630 may be configured to change the state information to indicate that the monitored location 602 is safe only upon receipt of a communication indicating a clear event (e.g., rather than making such a change solely due to the lack of additional events being detected). This feature can prevent a "crash and smash" robbery (e.g., where an intruder promptly destroys or disables monitoring equipment) from being successfully executed. In addition, in some implementations, the surveillance service 630 may be configured to monitor one or more particular zones within the monitored location 602, such as one or more particular rooms or other distinct regions within and/or around the monitored location 602 and/or one or more defined regions within the FOVs of the respective image capture devices deployed in the monitored location (e.g., the cameras 604A and 604B shown in FIG. 6).

The individual monitoring application(s) 632 of the monitoring center environment 622 may be configured to enable monitoring personnel to interact with respective computing devices to provide monitoring services for respective locations (e.g., the monitored location 602), and to execute a variety of programmatic operations in response to such interactions. For example, in some implementations, a monitoring application 632 may control its host computing device to provide information regarding events detected at monitored locations, such as the monitored location 602, to a person operating that computing device. Such events may include, for example, detected movement within a particular zone of the monitored location 602. As described above in connection with FIGS. 1 and 2, in some implementations, the monitoring application 632 may cause a monitoring device 1016 to present video clips of events within individual event windows 106 of a screen 102, and may further establish a streaming connection with one or more cameras 604 at the monitored location and cause the monitoring device 1016 to provide streamed video from such camera(s) 604 within the video feed windows 112 and/or a main viewer window 114 of a screen 110, as well as to allow audio communication between the monitoring device 1016 and the camera(s) 604.

The customer application(s) 634 of the customer device(s) 624 may be configured to enable customers to interact with their computing devices (e.g., their smartphones or personal computers) to access various services provided by the security system 600 for their individual homes or other locations (e.g., the monitored location 602), and to execute a variety of programmatic operations in response to such interactions. For example, in some implementations, a customer application 634 may control a customer device 624 (e.g., a smartphone or personal computer) to provide information regarding events detected at monitored locations, such as the monitored location 602, to the customer operating that customer device 624. Such events may include, for example, detected movement within a particular zone of the monitored location 602. In some implementations, the customer application 634 may additionally or alternatively be configured to process input received from the customer to activate or deactivate one or more of the devices disposed within the monitored location 602. Further, as described above in connection with FIG. 3, the customer application 634 may additionally or alternatively be configured to establish a streaming connection with one or more cameras 604 at the monitored location and cause the customer device 624 to display streamed video from such camera(s) 604, as well as to allow audio communication between the customer device 624 and the camera(s) 604.

Figure 7:
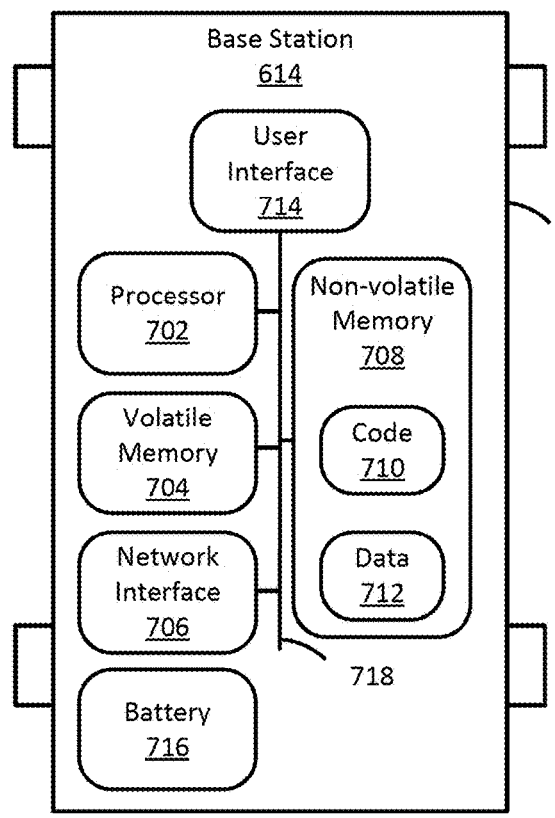
FIG. 7 shows an example implementation of the base station of the security system shown in FIG. 6, according to some implementations of the present disclosure.

Turning now to FIG. 7, an example base station 612 is schematically illustrated. As shown in FIG. 7, the base station 612 may include at least one processor 702, volatile memory 704, non-volatile memory 708, at least one network interface 706, a user interface 714, a battery assembly 716, and an interconnection mechanism 718. The non-volatile memory 708 may store executable code 710 and, as illustrated, may also include a data store 712. In some implementations, the features of the base station 612 enumerated above may be incorporated within, or may otherwise be supported by, a housing 720. In some implementations, the user interface 714 of the base station 612 may include only one or more speakers to provide audio output to a user concerning operational state changes of the security system 600, detected threats, etc., and/or one or more visual indicators (e.g., light emitting diode (LED) indicators) to indicate when the base station 612 is operational, responding to a user input (e.g., via the keypad 608), etc. In other implementations, the user interface may additionally or alternatively include a more complex output component (e.g., a display screen) and/or may include one or more user input components, such as one or more microphones (e.g., to receive voice commands) and/or a keypad (e.g., to receive tactile input).

In some implementations, the non-volatile (non-transitory) memory 708 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In some implementations, the code 710 stored in the non-volatile memory may include an operating system and one or more applications or programs that are configured to execute under the control of the operating system. In some implementations, the code 710 may additionally or alternatively include specialized firmware and embedded software that is executable without dependence upon a commercially available operating system. In any event, regardless how the code 710 is embodied, execution of the code 710 may implement the surveillance client 616 shown in FIG. 6 and enable the storage and manipulation of data for the surveillance client 616 within the data store 712.

The processor 702 of the base station 612 may include one or more processors configured to execute instructions encoded within a computer-readable medium, such as a computer program embodied by the code 710, to control the operations of the base station 612. As used herein, the term "processor" describes circuitry that executes a function, an operation, or a sequence of operations. The function, operation, or sequence of operations may be hard coded into the circuitry or soft coded by way of instructions held in a memory device (e.g., the volatile memory 704) and executed by the circuitry. In some implementations, the processor 702 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), and/or multicore processors.

Prior to executing the code 710, the processor 702 may copy at least a portion of the code 710 from the non-volatile memory 708 to the volatile memory 704. In some implementations, the volatile memory 704 may include one or more static or dynamic random access memory (RAM) chips and/or cache memory (e.g., memory disposed on a silicon die of the processor 702). Volatile memory 704 may offer a faster response time than a main memory, such as the non-volatile memory 708.

Through execution of the code 710, the processor 702 may control operation of the network interface 706. For instance, in some implementations, the network interface 706 may include one or more physical interfaces (e.g., a radio, an ethernet port, a universal serial bus (USB) port, etc.) as well as a software stack including drivers and/or other code 710 that is configured to communicate with the one or more physical interfaces to support one or more LAN, PAN, and/or WAN standard communication protocols. Such communication protocols may include, for example, transmission control protocol (TCP) and user datagram protocol (UDP) among others. As such, the network interface 706 may enable the base station 612 to access and communicate with other computing devices (e.g., the other devices disposed in the monitored location 602 of FIG. 6) via a computer network (e.g., the LAN established by the router 614 of FIG. 6, the network(s) 620 of FIG. 6, and/or a point-to-point connection). For instance, in some implementations, the network interface 706 may utilize sub-GHz wireless networking to transmit wake messages to the other computing devices to request streams of sensor data.

Through execution of the code 710, the processor 702 may additionally control operation of hardware and a software stack including drivers and/or other code 710 that is configured to communicate with other system devices. As such, the base station 612 may interact with other system components in response to received inputs. Such inputs may specify, for example, values that are to be stored in the data store 712. The base station 612 may further provide outputs representing values stored in the data store 712. In some implementations, the base station 612 may additionally include one or more light-emitting diodes (LEDs) or other visual indicators to visually communication information, such as system status or alarm events. Further, in some implementations, the base station 612 may additionally or alternatively include a siren (e.g., a 95 decibel (dB) siren) or other audio output device that may be controlled by the processor 702 to output an audio indication that a break-in event has been detected.

The various components of the base station 612 described above may communicate with one another via the interconnection mechanism 718. In some implementations, the interconnection mechanism 718 may include a communications bus. Further, in some implementations, the battery assembly 716 may be configured to supply operational power to the various features of the base station 612 described above. In some implementations, the battery assembly 716 may include at least one rechargeable battery (e.g., one or more nickel metal hydride (NiMH) or lithium batteries). In some implementations, such a rechargeable battery (or batteries) may have a runtime capacity sufficient to operate the base station 612 for twenty-four hours or longer while the base station 612 is disconnected from or otherwise not receiving line power. In some implementations, the battery assembly 716 may additionally or alternatively include power supply circuitry to receive, condition, and distribute line power to operate the base station 612 and/or to recharge one or more rechargeable batteries. Such power supply circuitry may include, for example, a transformer and a rectifier, among other circuitry, to convert AC line power to DC device and/or recharging power.

Figure 8:
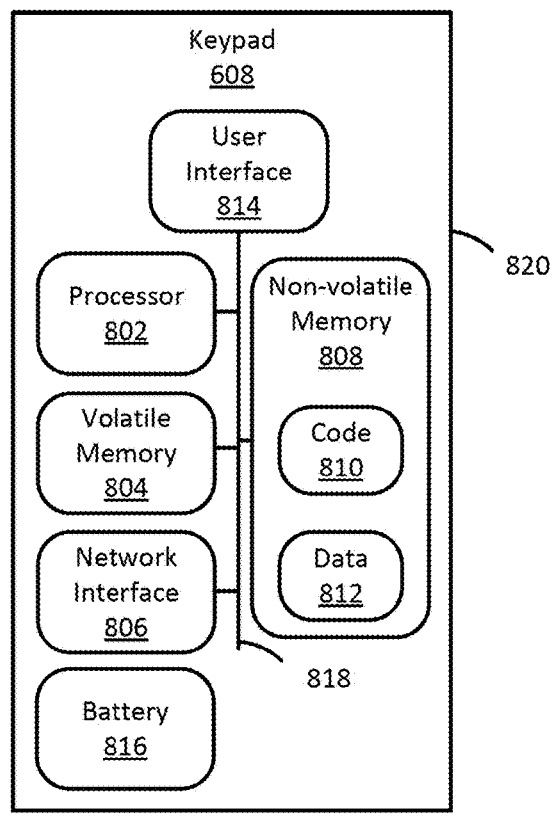
FIG. 8 shows an example implementation of the keypad of the security system shown in FIG. 6, according to some implementations of the present disclosure.

Turning now to FIG. 8, an example keypad 608 is schematically illustrated. As shown in FIG. 8, the keypad 608 may include at least one processor 802, volatile memory 804, non-volatile memory 808, at least one network interface 806, a user interface 814, a battery assembly 816, and an interconnection mechanism 818. The non-volatile memory 808 may store executable code 810 and, as illustrated, may also include a data store 812. In some implementations, the features of the keypad 608 enumerated above may be incorporated within, or may otherwise be supported by, a housing 820.

In some implementations, the respective descriptions of the processor 702, the volatile memory 704, the non-volatile memory 708, the interconnection mechanism 718, and the battery assembly 716 with reference to the base station 612 are applicable to the processor 802, the volatile memory 804, the non-volatile memory 808, the interconnection mechanism 818, and the battery assembly 816 with reference to the keypad 608. As such, those descriptions will not be repeated here.

Through execution of the code 810, the processor 802 of the keypad 608 may control operation of the network interface 806. In some implementations, the network interface 806 may include one or more physical interfaces (e.g., a radio, an ethernet port, a USB port, etc.) and a software stack including drivers and/or other code 810 that is configured to communicate with the one or more physical interfaces to support one or more LAN, PAN, and/or WAN standard communication protocols. Such communication protocols may include, for example, TCP and UDP, among others. As such, the network interface 806 may enable the keypad 608 to access and communicate with other computing devices (e.g., the other devices disposed in the monitored location 602 of FIG. 6) via a computer network (e.g., the LAN established by the router 614).

Through execution of the code 810, the processor 802 may additionally control operation of the user interface 814.

In some implementations, the user interface 814 may include user input and/or output devices (e.g., physical keys arranged as a keypad, a touchscreen, a display, a speaker, a camera, a biometric scanner, an environmental sensor, etc.) and a software stack including drivers and/or other code 810 that is configured to communicate with the user input and/or output devices. As such, the user interface 814 may enable the keypad 608 to interact with users to receive inputs and/or render outputs. Examples of outputs that may be rendered by the user interface 814 include one or more GUIs comprising one or more controls configured to display outputs and/or receive inputs. The inputs received by the user interface 814 may specify, for example, values that are to be stored in the data store 812. The outputs provided by the user interface 814 may further indicate values stored in the data store 812. In some implementations, parts of the user interface 814 (e.g., one or more LEDs) may be accessible and/or visible as part of, or through, the housing 820.

Figure 9:
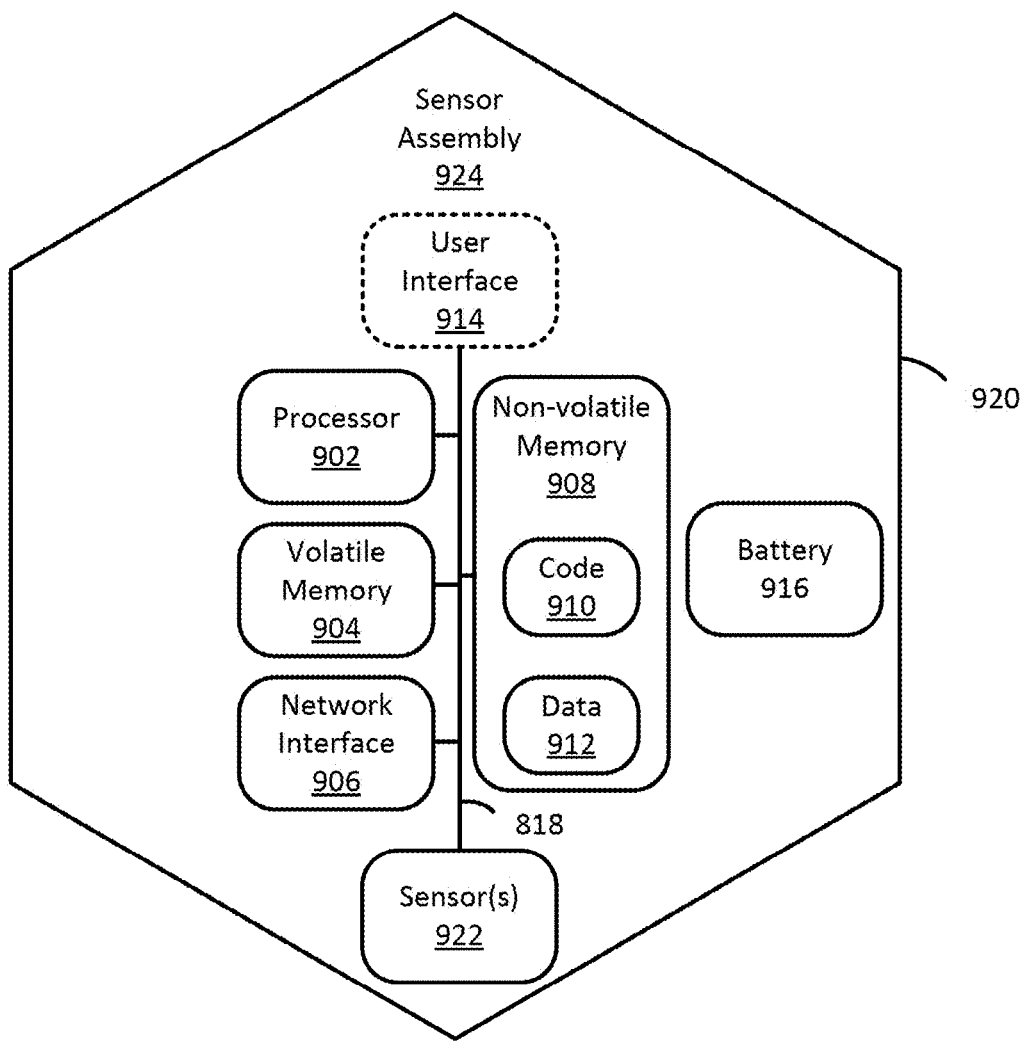
FIG. 9 shows an example implementation of a security sensor of the security system shown in FIG. 6, according to some implementations of the present disclosure.

Turning now to FIG. 9, an example sensor assembly 924 is schematically illustrated. Several example implementations of the sensor assembly 924 (e.g., the cameras 604 and 604B, the motion sensor assembly 610, and the contact sensor assemblies 606) are illustrated in FIG. 6 and described above. As shown in FIG. 9, the sensor assembly 924 may include at least one processor 902, volatile memory 904, non-volatile memory 908, at least one network interface 906, a battery assembly 916, an interconnection mechanism 918, and at least one sensor 922. The non-volatile memory 908 may store executable code 910 and, as illustrated, may also include a data store 912. In some implementations, the features of the sensor assembly 924 enumerated above may be incorporated within, or included as a part of, a housing 920. Further, in some implementations, the sensor assembly 924 may additionally include a user interface 914.

In some implementations, the respective descriptions of the processor 702, the volatile memory 704, the non-volatile memory 708, the interconnection mechanism 718, and the battery assembly 716 with reference to the base station 612 are applicable to the processor 902, the volatile memory 904, the non-volatile memory 908, the interconnection mechanism 918, and the battery assembly 916 with reference to the sensor assembly 924. As such, those descriptions will not be repeated here.

Through execution of the code 910, the processor 902 may control operation of the network interface 906 and the user interface 914 (if present). In some implementations, the network interface 906 may include one or more physical interfaces (e.g., a radio, an ethernet port, a USB port, etc.) and a software stack including drivers and/or other code 910 that is configured to communicate with the one or more physical interfaces to support one or more LAN, PAN, and/or WAN standard communication protocols. Such communication protocols may include, for example, TCP and UDP, among others. As such, the network interface 906 may enable the sensor assembly 924 to access and communicate with other computing devices (e.g., the other devices disposed in the monitored location 602 of FIG. 6) via a computer network (e.g., the LAN established by the router 614). For instance, in some implementations, when executing the code 910, the processor 902 may control the network interface to stream (e.g., via UDP) sensor data acquired from the sensor assembly 922 to the base station 612. Further, in some implementations, through execution of the code 910, the processor 902 may additionally or alternatively control the network interface 906 to enter a power conservation mode, e.g., by powering down a 2.4 GHz radio and powering up a sub-GHz radio that are both included in the network interface 906. In such implementations, through execution of the code 910, the processor 902 may additionally control the network interface 906 to enter a streaming mode, e.g., by powering up a 2.4 GHz radio and powering down a sub-GHz radio, for example, in response to receiving a wake signal from the base station via the sub-GHz radio.

Through execution of the code 910, the processor 902 may additionally or alternatively control other operations of the sensor assembly 924. In some implementations, for example, a user interface 914 of the sensor assembly 924 may include user input and/or output devices (e.g., physical buttons, a touchscreen, a display, a speaker, a camera, an accelerometer, a biometric scanner, an environmental sensor, one or more LEDs, etc.) and a software stack including drivers and/or other code 910 that is configured to communicate with the user input and/or output devices. As such, the sensor assembly 924 may enable the user interface 914 to interact with users to receive inputs and/or render outputs. The outputs rendered by the user interface 814 may include, for example, one or more GUIs including one or more controls configured to display output and/or receive input. The inputs received by the user interface 914 may, for example, specify values that are to be stored in the data store 912. The outputs provided by the user interface 94 may further indicate values stored in the data store 912. In some implementations, parts of sensor assembly 924 may be accessible and/or visible as part of, or through, the housing 920.

As shown in FIG. 9, the sensor assembly 924 may include one or more types of sensors 922, such as one or more of the sensors described above with reference to the cameras 604 and 604B, the motion sensor assembly 610, and the contact sensor assembly 606 of FIG. 6, or other types of sensors. In some implementations, for example, the sensor(s) 922 may include a camera and a temperature sensor. Regardless of the type(s) of sensor(s) XD22 that employed, the processor 902 may (e.g., via execution of the code 910) acquire sensor data from the sensor(s) 922 and stream the acquired sensor data to the processor 902 for communication to the base station 612.

It should be noted that, in some implementations of the devices 802 and 902, the operations executed by the processors 802 and 902 while under control of respective control of the code 810 and 910 may be hardcoded and/or implemented using hardware, rather than as a combination of hardware and software.

Figure 10:
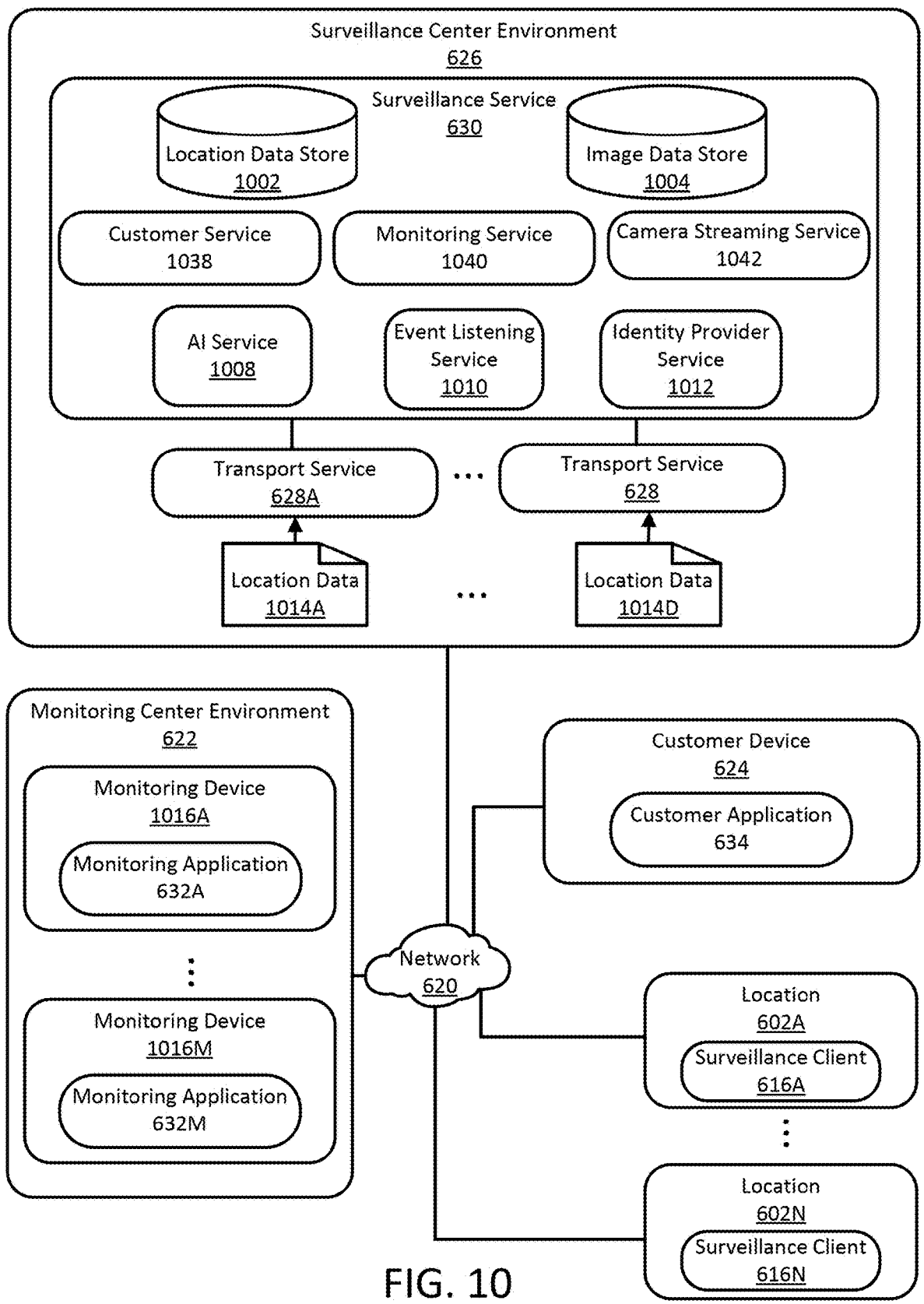
FIG. 10 shows example implementations of the surveillance center environment and the monitoring center environment of the security system shown in FIG. 6, according to some implementations of the present disclosure.

Turning now to FIG. 10, aspects of the surveillance center environment 626, the monitoring center environment 622, one of the customer devices 624, the network(s) 620, and a plurality of monitored locations 602A through 602N (collectively referred to as the monitored locations 602) shown in FIG. 6 are schematically illustrated. As shown in FIG. 10, in some implementations, the surveillance service 630 may include a location data store 1002, an image data store 1004, an artificial intelligence (AI) service 1008, an event listening service 1010, an identity provider service 1012, a customer service 1038, a monitoring service 1040, and a camera streaming service 1042. As also shown in FIG. 10, the monitoring center environment 622 may include multiple monitoring devices 1016A through 1016M (collectively referred to as the monitoring devices 1016) that host or are otherwise configured to access respective monitoring applications 632A through 632M, and individual monitored locations 602A through 602N may include respective surveillance clients 616A through 616N (collectively referred to as the surveillance clients 616), e.g., within base stations 612

(not shown in FIG. 10) at the various monitored locations 602A through 602N. As described above in connection with FIGS. 1 and 2, in some implementations, the monitoring applications 632 may be configured to cause the monitoring devices 1016 to display screens 102, 110 that enable a monitoring agent 104 to visually monitor activity one or more of the monitored locations 602, as well as engage in an audio dialog with one or more individuals at such locations (e.g., via microphones and speakers of cameras 604 at the monitored locations 602). Further, as additionally shown in FIG. 10, in some implementations, the transport service(s) 628 may include multiple different transport services 628A through 628D configured to receive location data packages, e.g., location data packages 1014A through 1014D, from the surveillance clients 616A through 616N deployed at the respective monitored locations 602A through 602N.

The location data store 1002 of the surveillance service 630 may be configured to store, within a plurality of records, location data in association with identifiers of customers for whom the monitored location 602 is monitored. For example, the location data may be stored in a record with an identifier of a customer and/or an identifier of the monitored location 602 to associate the location data with the customer and the monitored location 602. The image data store 1004 of the surveillance service 630 may be configured to store, within a plurality of records, one or more frames of image data in association with identifiers of locations and timestamps at which the image data was acquired.

The AI service 1008 of the surveillance service 630 may be configured to process images and/or sequences of images to identify semantic regions, movement, human faces, and other features within images or a sequence of images. The event listening service 1010 of the surveillance service 630 may be configured to scan received location data for events and, where an event is identified, execute one or more event handlers to process the event. In some implementations, such event handlers may be configured to identify events and to communicate messages concerning those events to one or more recipient services (e.g., the customer service 1038 and/or the monitoring service 1040). Operations that may be performed by the customer service 1038 and/or the monitoring service 1040 based on the events identified by the event listening service 1010 are described further below. In some implementations, the event listening service 1010 may interoperate with the AI service 1008 to identify events within image data.

The identity provider service 1012 may be configured to receive authentication requests from the surveillance clients 616 that include security credentials. When the identity provider 1012 can authenticate the security credentials in a request (e.g., via a validation function, cross-reference lookup, or some other authentication process), the identity provider 1012 may communicate a security token in response to the request. A surveillance client 616 may receive, store, and include the security token in subsequent packages of location data (e.g., the location data 1014A), so that the recipient transport service (e.g., the transport service 628A) is able to securely process (e.g., unpack/parse) the packages to extract the location data prior to passing the location data to the surveillance service 630. In some implementations, for example, the security token may be a JSON Web Token (JWT), such as the token 1802 that is described below in connection with FIG. 18.

The transport service(s) 628 of the surveillance center environment 626 may be configured to receive the location data packages 1014, verify the authenticity of the packages 1014, parse the packages 1014, and extract the location data encoded therein prior to passing the location data to the surveillance service 630 for processing. The location data that is so processed may include any of the location data types described above with reference to FIG. 6. In some implementations, individual transport services 628 may be configured to process location data packages 1014 generated by location-based monitoring equipment of particular manufacturers and/or models. The surveillance clients 616 may be configured to generate and communicate, e.g., to the surveillance service 630 via the network(s) 620, packages of location data (e.g., the location data packages 1014) based on sensor information received at the monitored locations 602.

The monitoring service 1040 may maintain records concerning the events identified by the event listening service 1010 and may assign individual events to various monitoring agents 104 who are currently on-line with monitoring applications 632. The monitoring application 632 operated by a given monitoring agent may then add the events assigned to that monitoring agent 104 to a queue of events, e.g., within the event windows 106 shown in FIG. 1, for review by that monitoring agent 104. In some implementations, a given monitoring application 632 may use data describing the events within its queue to retrieve location data and/or image data (from the location data store 1002 and/or the image data store 1004, respectively) for presentation within or in association with the event windows 106.

In response to the monitoring agent 104 identifying a particular event to review (e.g., by clicking on one of the event windows 106), the monitoring service 1040 may interact with the camera streaming service 1042 to obtain access credentials to enable the establishment of peer-to-peer connections with one or more cameras 604 at the monitored location 602 corresponding to the event, and to review live video and/or audio streamed from those cameras, e.g., within the video feed windows 112 and/or the main viewer window 114 shown in FIG. 2, as well as to verbally communicate in real time with one or more individuals in the vicinity of the camera(s) 604. Example interactions amongst components of the security system 600 to enable the streaming of video and/or audio data between the camera(s) 604 at the monitored location 602 and the monitoring application 632 operated by the monitoring agent 104 are described below in connection with FIG. 12.

Figure 11:
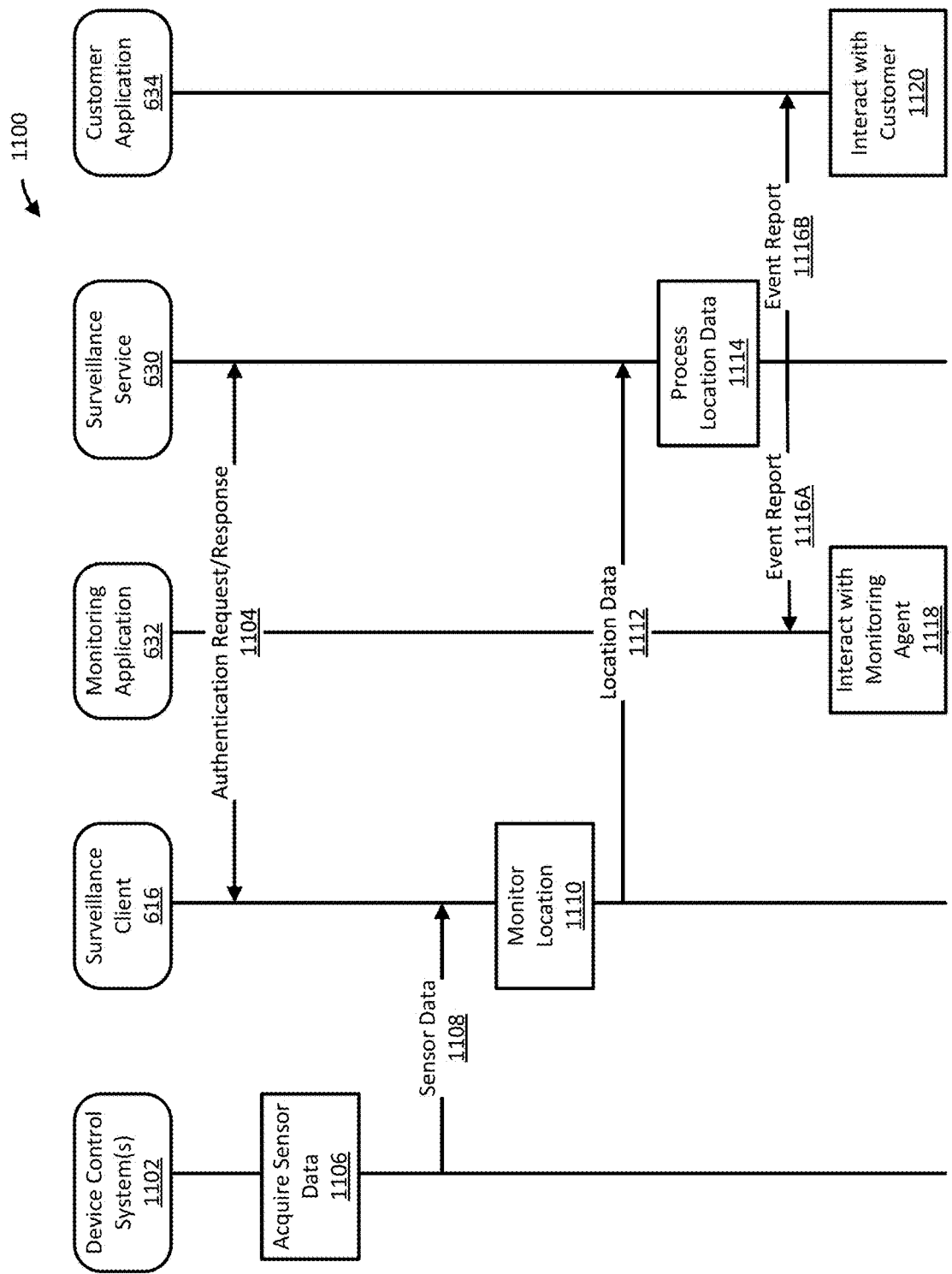
FIG. 11 is a sequence diagram of a monitoring process that may be performed by components of the security system shown in FIG. 6, according to some implementations of the present disclosure.

Turning now to FIG. 11, an example monitoring process 1100 that may be employed by the security system 600 is illustrated as a sequence diagram. In particular, in some implementations, various portions of the process 1100 may be executed by (A) one or more location-based devices (e.g., the devices 604 through 610 of FIG. 6) under the control of device control system (DCS) code (e.g., either the code 810 or 910) implemented by at least one processor (e.g., either of the processors 802 or 902 of FIG. 8 or 9); (B) a base station (e.g., the base station 612 of FIG. 6) under control of a surveillance client (e.g., the surveillance client 616 of FIG. 6); (C) a monitoring center environment (e.g., the monitoring center environment 622 of FIG. 6) under control of a monitoring application (e.g., the monitoring application 632 of FIG. 6); (D) a surveillance center environment (e.g., the surveillance center environment 626 of FIG. 6) under control of a surveillance service (e.g., the surveillance service 630 of FIG. 6); and (E) a customer device (e.g., the customer device 624 of FIG. 6) under control of a customer application (e.g., customer application 634 of FIG. 6).

As shown in FIG. 11, the process 1100 may begin with the surveillance client 616 authenticating with the surveillance service 630 by exchanging one or more authentication requests and responses 1104 with the surveillance service 630. More specifically, in some implementations, the surveillance client 616 may communicate an authentication request to the surveillance service 630 via one or more API calls to the surveillance service 630. In such implementations, the surveillance service 630 may parse the authentication request to extract security credentials therefrom and pass such security credentials to an identity provider (e.g., the identity provider service 1012 of FIG. 10) for authentication. In some implementations, upon the identity provider authenticating the security credentials, the surveillance service 630 may generate a security token and communicate that security token as a payload within an authentication response to the authentication request. In such implementations, if the identity provider is unable to authenticate the security credentials, the surveillance service 630 may instead generate an error (e.g., an error code) and communicate that error as the payload within the authentication response to the authentication request. Upon receipt of the authentication response, the surveillance client 616 may parse the authentication response to extract the payload. If the payload includes the error code, the surveillance client 616 may retry authentication and/or interoperate with a user interface of its host device (e.g., the user interface 714 of the base station 612 of FIG. 7) to render output indicating the authentication failure. If the payload includes the security token, the surveillance client 616 may store the security token for subsequent use in communication of location data. It should be noted that, in some implementations, the security token may have a limited lifespan (e.g., one hour, one day, one week, one month, etc.) after which the surveillance client 616 may be required to reauthenticate with the surveillance service 630. In some implementations, for example, the lifespan of the security token (e.g., a token 1802 of the type described below in connection with FIG. 18) may be defined within the header 1804 and/or the payload 1806 of the token 1802 (e.g., as one or more claims).

Continuing with the process 1100, one or more device control systems 1102 hosted by one or more location-based devices may acquire (1106) sensor data descriptive of a location (e.g., the monitored location 602 of FIG. 6). The sensor data that is so acquired may be any of a variety of types, as discussed above with reference to FIGS. 6-10. In some implementations, one or more of the device control systems 1102 may acquire sensor data continuously. In other implementations, one or more of the DCSs 1102 may additionally or alternatively acquire sensor data in response to an event, such as expiration of a timer (a push event) or receipt of an acquisition polling signal communicated by the surveillance client 616 (a poll event). In some implementations, one or more of the device control systems 1102 may stream sensor data to the surveillance client 616 with minimal processing beyond acquisition and digitization. In such implementations, the sensor data may constitute a sequence of vectors with individual vector members including, for example, a sensor reading and a timestamp. In some implementations, one or more of the device control systems 1102 may execute additional processing of sensor data, such as generation of one or more summaries of multiple sensor readings. Further still, in some implementations, one or more of the device control systems 1102 may execute sophisticated processing of sensor data. For example, if the sensor(s) 922 of a sensor assembly 924 (shown in FIG. 9) include an image capture device, the device control system 1102 may execute image processing routines such as edge detection, motion detection, facial recognition, threat assessment, event generation, etc.

Continuing with the process 1100, the device control component(s) 1102 may communicate the sensor data 1108 to the surveillance client 616. As with sensor data acquisition, the device control system(s) 1102 may communicate the sensor data 1108 continuously or in response to an event, such a push event (originating with the device control system(s) 1102) or a poll event (originating with the surveillance client 616).

Continuing with the process 1100, the surveillance client 616 may monitor (1110) the monitored location 602 by processing the received sensor data 1108. In some implementations, for example, the surveillance client 616 may execute one or more image processing routines. Such image processing routines may include any of the image processing routines described above with reference to the operation 1106. By distributing at least some of the image processing routines between the device control system(s) 1102 and surveillance client 616, the amount of power consumed by battery-powered devices may be decreased by off-loading processing to line-powered devices. Moreover, in some implementations, the surveillance client 616 may execute an ensemble threat detection process that utilizes sensor data 1108 from multiple, distinct device control systems 1102 as input. For instance, in some implementations, the surveillance client 616 may attempt to corroborate an open state received from a contact sensor with motion and facial recognition processing of an image of a scene including a window or door to which the contact sensor is affixed. If two or more of the three processes indicate the presence of an intruder, a score (e.g., a threat score) may be increased and or a break-in event may be declared, locally recorded, and communicated. Other processing that the surveillance client 616 may execute includes outputting local alerts (e.g., in response to detection of particular events and/or satisfaction of other criteria) and detection of maintenance conditions for location-based devices, such as a need to change or recharge low batteries and/or replace/maintain the devices that host the device control system(s) 1102. Any of the processes described above within the operation 1110 may result in the creation of location data that specifies the results of such processes.

Continuing with the process 1100, the surveillance client 616 may communicate the location data 1112 to the surveillance service 630 (via the transport service(s) 628). As with the communication of the sensor data 1108, the surveillance client 616 may communicate the location data 1112 continuously or in response to an event, such as a push event (originating with the surveillance client 616) or a poll event (originating with the surveillance service 630).

Continuing with the process 1100, the surveillance service 630 may process (1114) the received location data. In some implementations, for example, the surveillance service 630 may execute one or more of the processes described above with reference to the operations 1106 and/or 1110. In some implementations, the surveillance service 630 may additionally or alternatively calculate a score (e.g., a threat score) or further refine an existing score using historical information associated with the monitored location 602 identified in the location data and/or other locations geographically proximal to the monitored location 602 (e.g., within the same zone improvement plan (ZIP) code). For instance, in some implementations, if multiple break-ins have been recorded for the monitored location 602 and/or other locations within the same ZIP code, the surveillance service 630 may increase a score calculated by a device control system 1102 and/or the surveillance client 616.

In some implementations, the surveillance service 630 may apply a set of rules and criteria to the location data 1112 to determine whether the location data 1112 includes any events and, if so, communicate an event report 1116A and/or 1116B to the monitoring application 632 and/or the customer application 634. In some implementations, for example, the monitoring service 1040 may assign one or more events to a particular monitoring agent 104, so that those events will be forwarded to the monitoring application 632 that the monitoring agent 104 is operating, e.g., for presentation within respective event windows 106 (shown in FIG. 1). An event may, for example, be an event of a certain type (e.g., break-in) or an event of a certain type that satisfies additional criteria (e.g., movement within a particular zone combined with a threat score that exceeds a threshold value). The event reports 1116A and/or 1116B may have a priority based on the same criteria used to determine whether the event reported therein is reportable or may have a priority based on a different set of criteria or rules.

Continuing with the process 1100, the monitoring application 632 within the monitoring center environment 622 may interact (1118) with monitoring agents 104 through, for example, one or more GUIs, such as the screens 102 and 110 shown in FIGS. 1 and 2. Such GUIs may provide details and context regarding one or more events.

As shown in FIG. 11, the customer application 634 of a customer device 624 (e.g., a smartphone, personal computer, or other endpoint device) may likewise interact (1120) with at least one customer through, for example, one or more GUIs. Such GUIs may provide details and context regarding one or more events.

It should be noted that the processing of sensor data and/or location data, as described above with reference to the operations 1106, 1110, and 1114, may be executed by processors disposed within various parts of the security system 600. In some implementations, the device control system(s) 1102 may execute minimal processing of the sensor data (e.g., acquisition and streaming only) and the remainder of the processing described above may be executed by the surveillance client 616 and/or the surveillance service 630. This approach may be helpful to prolong battery runtime of location-based devices. In other implementations, the device control system(s) 1102 may execute as much of the sensor data processing as possible, leaving the surveillance client 616 and the surveillance service 630 to execute only processes that require sensor data that spans location-based devices and/or locations. Such an approach may be helpful to increase scalability of the security system 600 with regard to adding new locations.

Figure 12:
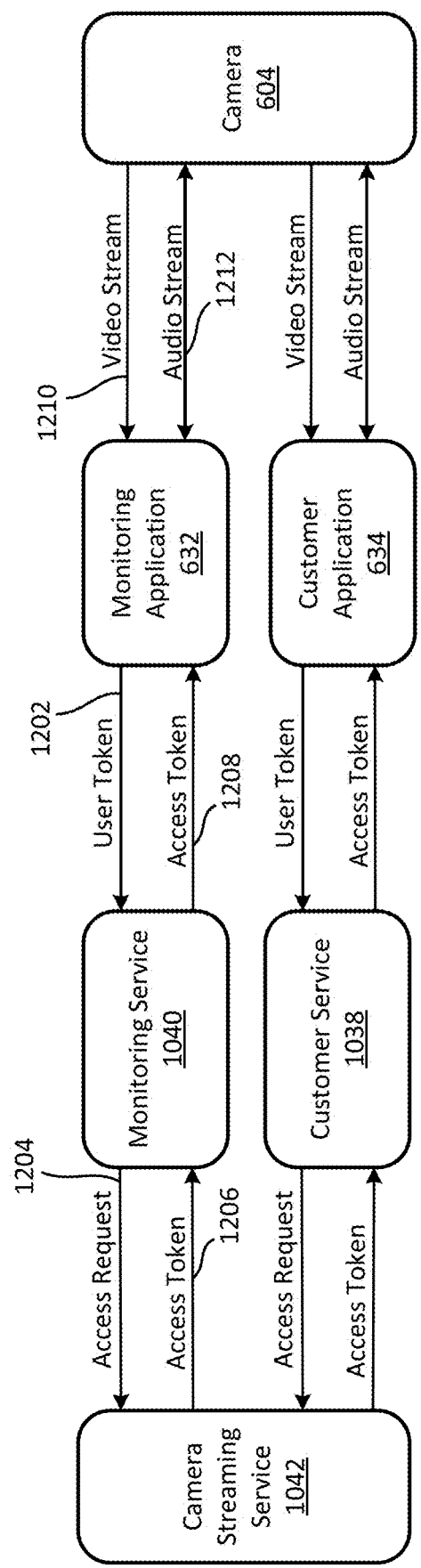
FIG. 12 shows example processes for establishing peer-to-peer connections between components of the security system shown in FIG. 6, to enable the streaming of video and/or audio data, according to some implementations of the present disclosure.
Figure 13:
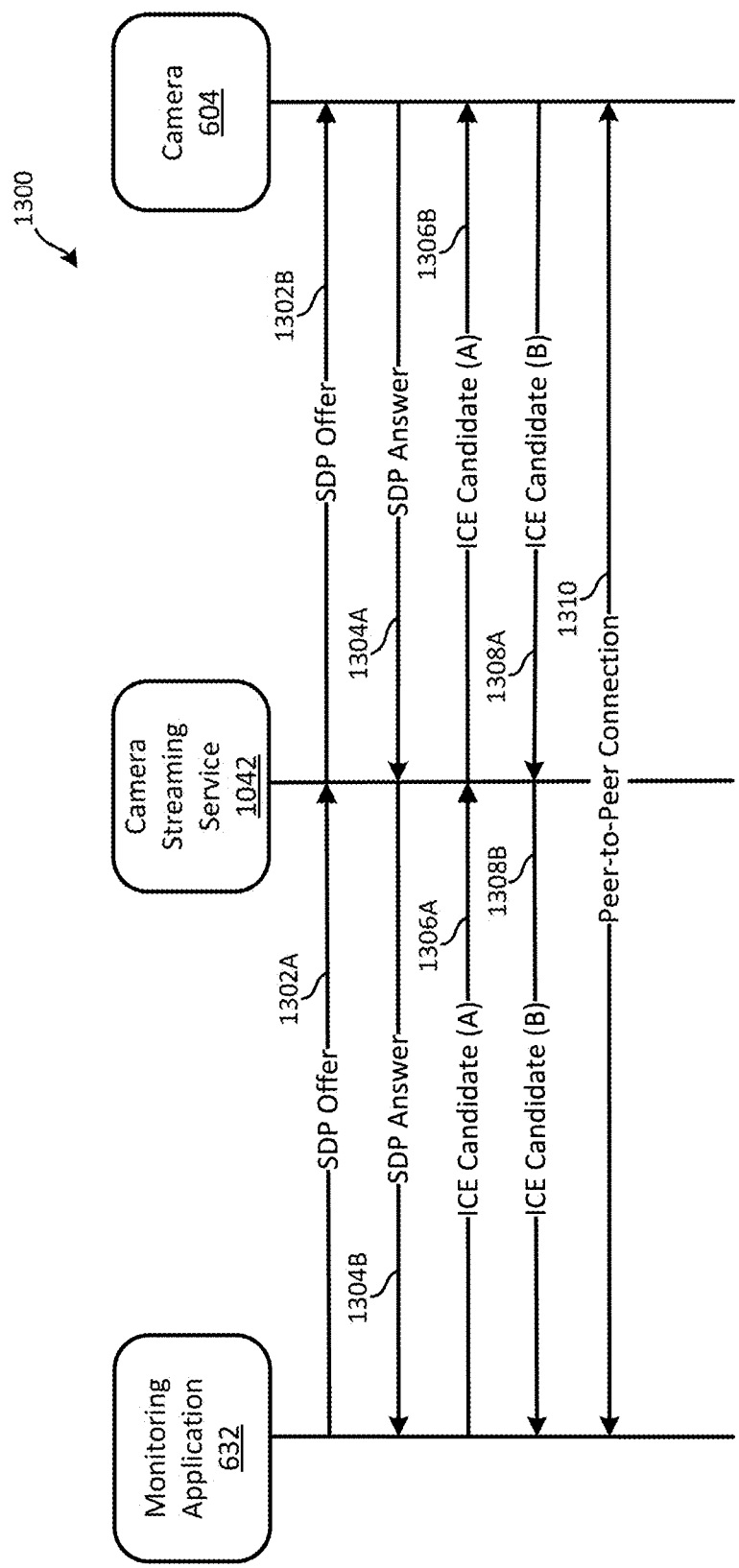
FIG. 13 is a sequence diagram showing an example signaling process that can be employed to establish peer-to-peer connections between components of the security system shown in FIG. 6, to enable the streaming of video and/or audio data, according to some implementations of the present disclosure.

FIGS. 12 and 13 illustrate an example technique for establishing point-to-point connections (e.g., for video and/or audio streaming) between a camera 604 at a monitored location 602 and either or both of (A) a monitoring application 632 hosted on or otherwise accessible by a monitoring device 1016, and (B) a customer application 634 hosted on or otherwise accessible by a customer device 624. In some implementations, the monitoring application 632 and the customer application 634 may be web applications that are accessed using browsers hosted on the monitoring device 1016 and the customer device 624, respectively, and the WebRTC functionality of those browsers may be used to establish peer-to-peer connections with the camera 604. As described below in connection with FIG. 13, the camera streaming service 1042 may provide signaling channels that are used establish peer-to-peer connections between the camera 604 and the respective browsers. As one example, the camera streaming service 1042 may be implemented using the Amazon Kinesis Video Streams service offered by Amazon Web Services (AWS).

As indicated by an arrow 1202 in FIG. 12, the monitoring application 632 may provide a user token to the monitoring service 1040. The user token may correspond to the monitoring agent 104 who has authenticated to monitoring application 632 and may be included in a request for live-streaming access to the camera(s) 604 at a monitored location 602. In some implementations, for example, such a camera access request may be sent from the monitoring application 632 to the monitoring service 1040 in response to a monitoring agent 104 selecting an event window 106 corresponding to a particular camera 604 as described above in connection with FIGS. 1 and 2. In some implementations, the user token may be a JWT, such as the token 1802 that is described below in connection with FIG. 18.

The monitoring service 1040 may evaluate the user token received from the monitoring application 632 (e.g., by validating a signature 1808 of the token as described below in connection with FIG. 18) and, if valid, may communicate with the camera streaming service 1042 to obtain an access token that the monitoring application 632 may subsequently use to access a signaling channel of the camera streaming service 1042. An example process by which signaling information may be exchanged between the monitoring application 632 and the camera 604, via a signaling channel established by the camera streaming service 1042, to determine configuration information for a peer-to-peer connection between the monitoring application 632 and the camera 604 is described below in connection with FIG. 13. In some implementations, the access token obtained from the camera streaming service 1042 may be a JWT, such as the token 1802 that is described below in connection with FIG. 18.

As indicated by an arrow 1204 in FIG. 12, in some implementations, the monitoring service 1040 may authenticate to the camera streaming service 1042 and request access to the camera streaming service 1042 on behalf of the monitoring application 632 that provided the user token (per the arrow 1202). In some implementations, the access request the monitoring service 1040 sends to the camera streaming service 1042 may specify one or more parameters that identify the specific monitored location 602 at issue, the specific camera(s) 604 to which access is to be granted, a specific time window during which access to such cameras 604 is to be granted, and/or other any of a number of other limitations or restrictions concerning whether and/or how access to the camera(s) 604 is to be permitted. The use of such parameters can help ensure that the camera(s) 604 are accessed only by authorized personnel and only as needed to evaluate a specific event.

Upon authenticating the access request received from the monitoring service 1040, the camera streaming service 1042 may establish a signaling channel between the monitoring application 632 and the camera 604, and generate an access token (e.g., a token 1802 of the type described below in connection with FIG. 18) that the monitoring application 632 can subsequently use to access that signaling channel (e.g., by making Web API calls to an API endpoint of the camera streaming service 1042). In some implementations, the monitoring service 1040 may configure the access token to include one or more of the parameters that were specified in the access request. For example, in some implementations, such parameters may be defined within a header 1804 and/or a payload 1806 of the access token (e.g., as one or more claims).

As indicated by arrows 1206 and 1208 in FIG. 12, the camera streaming service 1042 may send the generated access token to the monitoring service 1040, and the monitoring service 1040 may then pass that access token to the monitoring application 632. In some implementations, the camera streaming service 1042 may also send additional information along with the access token, such as a network address (e.g., a Web API endpoint) for the signaling channel established by the camera streaming service 1042, thus allowing the monitoring application 632 to make Web API calls to the camera streaming service 1042 for signaling purposes. As noted previously, the access token generated by the camera streaming service 1042 may be configured based on the parameters that were included in the access request the monitoring service 1040 sent to the camera streaming service 1042, so as to limit the ability of the recipient monitoring application 632 to access the established signaling channel in the manner defined by those parameters. For example, the access token generated by the camera streaming service 1042 may be set to expire after a particular time period based on a time limit parameter that was included in the access request.

As described below in connection with FIG. 13, upon receipt of the access token from the monitoring service 1040, the monitoring application 632 may send a session description protocol (SDP) offer to a network address of the signaling channel and the signaling channel may forward that SDP offer to the camera 604, thus initiating the signaling process to establish a peer-to-peer connection between the monitoring application 632 and the identified camera 604. Finally, as also described below in connection with FIG. 13, as indicated by arrows 1210 and 1212 in FIG. 12, upon identifying suitable interactive connectivity establishment (ICE) candidates, one or more peer-to-peer connections may be established between the monitoring application 632 and the camera 604, thus enabling the streaming of video data from the camera 604 to the monitoring application 632 and/or the exchange of audio data between the monitoring application 632 and the camera 604.

A similar process may be employed to establish one or more peer-to-peer connections between the customer application 634 and one or more camera(s) 604 at the monitored location, thus enabling the streaming of video data from the camera(s) 604 to the customer application 634 and/or the exchange of audio data between the customer application 634 and the camera(s) 604. That process will thus not be described again here. It should be appreciated, however, that the scope of the permissions provided in the access requests that are sent from the customer service 1038 to the camera streaming service 1042 may be different (e.g., less restrictive) than the scope of the permissions provided by access requests that are sent from the monitoring service 1040 to the camera streaming service 1042, as it may not be desirable to restrict a customer's ability to live stream with the camera in the same manner as the monitoring agents 104.

FIG. 13 is a sequence diagram 1300 illustrating how signaling information (e.g., WebRTC signaling information) can be exchanged between the monitoring application 632 (or alternatively the customer application 634) and a camera 604, via the camera streaming service 1042, to establish a peer-to-peer connection between the monitoring application 632 (or alternatively the customer application 634) and the camera 604. Although FIG. 13 depicts the exchange of signaling information between the monitoring application 632 and the camera 604, and the following section describes the exchange of signaling information between those two components, it should be appreciated that the same process may likewise be used to exchange signaling information between the customer application 634 and the camera 604.

As noted above, in some implementations, the monitoring application 632 may have received an access token for the camera streaming service 1042 from the monitoring service 1040 (see the arrow 1208 in FIG. 12) in response to providing a user token to the monitoring service 1040 (see the arrow 1202 in FIG. 12), and such access token may enable the monitoring application 632 to access a signaling channel established by the camera streaming service 1042, thus allowing the monitoring application 632 to make Web API calls to the camera streaming service 1042 for signaling purposes.

As shown in FIG. 13, the signaling process may begin with the monitoring application 632 using the received access token to send (1302A, 1302B) an SDP offer to the camera 604 (via the camera streaming service 1042). The monitoring application 632 may create the SDP offer, for example, by calling the CreateOffer( ) function of the WebRTC application programing interface (API) of a browser or other WebRTC-enabled component of the monitoring device 1016. The SDP offer may include information about the kind of media that is to be sent by the monitoring device 1016, its format, the transfer protocol being used, the internet protocol (IP) address and port of the monitoring device 1016, and/or other information needed to describe the to-be-transferred media and/or the monitoring device 1016.

Upon receiving the SDP offer from the monitoring application 632, the camera 604 may send (1304A, 1304B) an SDP answer to the monitoring application 632 via the camera streaming service 1042. The camera 604 may create the SDP answer, for example, by calling the CreateAnswer ( ) function of the WebRTC API of a browser or other WebRTC-enabled component of the camera 604. The SDP answer may include information about the kind of media that is to be sent by the camera 604, its format, the transfer protocol being used, the internet protocol (IP) address and port of the camera 604, and/or other information needed to describe the to-be-transferred media and/or the camera 604.

In addition to sharing information about the media that is to be exchanged and the respective devices that will be exchanging it, the monitoring application 632 and the camera 604 may share information about the network connections they are able to use to exchange that media. In particular, the monitoring application 632 may share one or more ICE candidates with the camera 604, and vice versa, with the individual ICE candidates sent by a device describing the available methods that device is able to use to communicate (either directly or through a traversal using relays around NAT (TURN) server). The monitoring application 632 and the camera 604 may gather ICE candidates, for example, by creating an ICE candidate event listener using the WebRTC API (e.g., by calling the function peerConnection.addEventListener('icecandidate', event => { . . . }).

In some implementations, the respective devices may propose their best ICE candidates first, making their way down the line toward their worse candidates. Ideally, ICE candidates employ the user data protocol (UDP) (since it's faster, and media streams are able to recover from interruptions relatively easily), but the ICE standard does allow transmission control protocol (TCP) candidates as well.

Possible UDP candidate types include host, peer reflexive (prflx), server reflexive (srflx), and relay. A "host" candidate is one for which its IP address is the actual, direct IP address of the remote peer. A "peer reflexive" candidate is one whose IP address comes from a symmetric network address translation (NAT) between the two peers. A "server reflexive" candidate is generated by a session traversal of UDP through NAT (STUN) server. A relay candidate is generated by a TURN server. Possible TCP candidate types include active, passive, and so. An "active" transport will try to open an outbound connection but won't receive incoming connection requests. A "passive" transport will receive incoming connection attempts but won't attempt a connection itself. A "so" transport will try to simultaneously open a connection with its peer.

As an example, FIG. 13 illustrates how the monitoring application 632 may send (1306A, 1306B) ICE candidate "A" to the camera 604, and the camera 604 may send (1308A, 1308B) ICE candidate "B" to the monitoring application 632. Different pairs of the identified ICE candidates may be tested and one of the endpoints which has been designated as the "controlling agent" may select one of the identified ICE candidate pairs to use to establish (1310) a peer-to-peer connection between the monitoring application 632 and the camera 604.

Additional information concerning the use of WebRTC to establish peer-to-peer connections can be found on the web pages accessible via the uniform resource locator (URL) "webrtc.org," the entire contents of which are hereby incorporated herein by reference.

Figure 14:
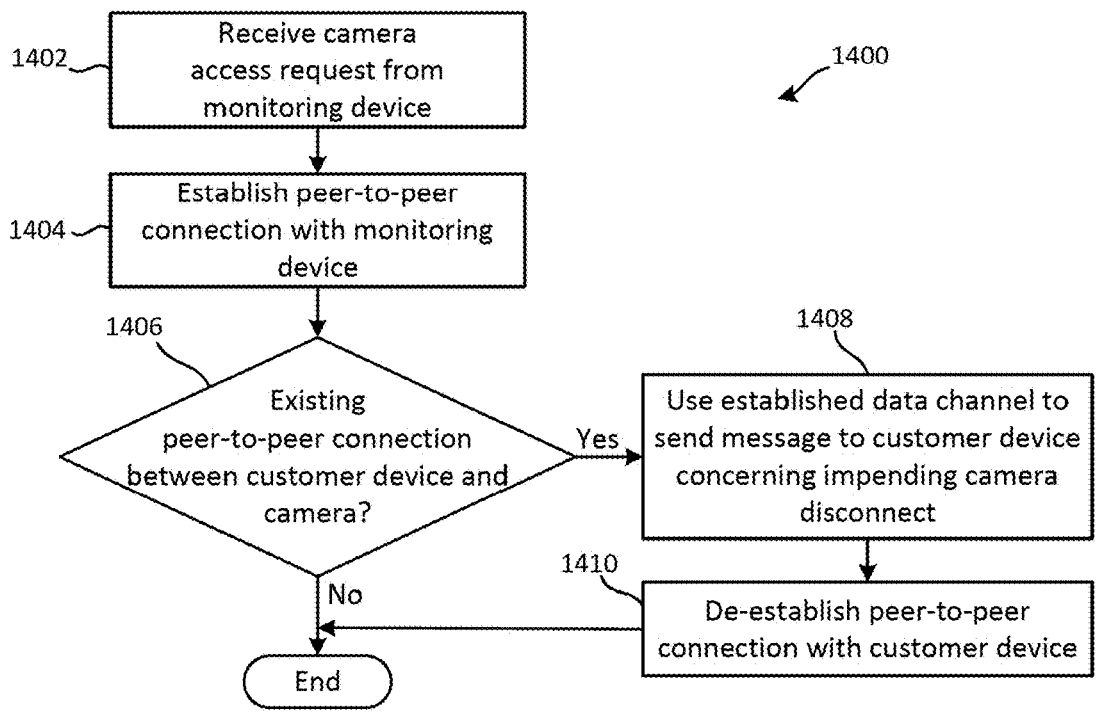
FIG. 14 is a flow chart showing a first example routine that may be executed by a camera of the of the security system shown in FIG. 6, according to some implementations of the present disclosure.
Figure 15:
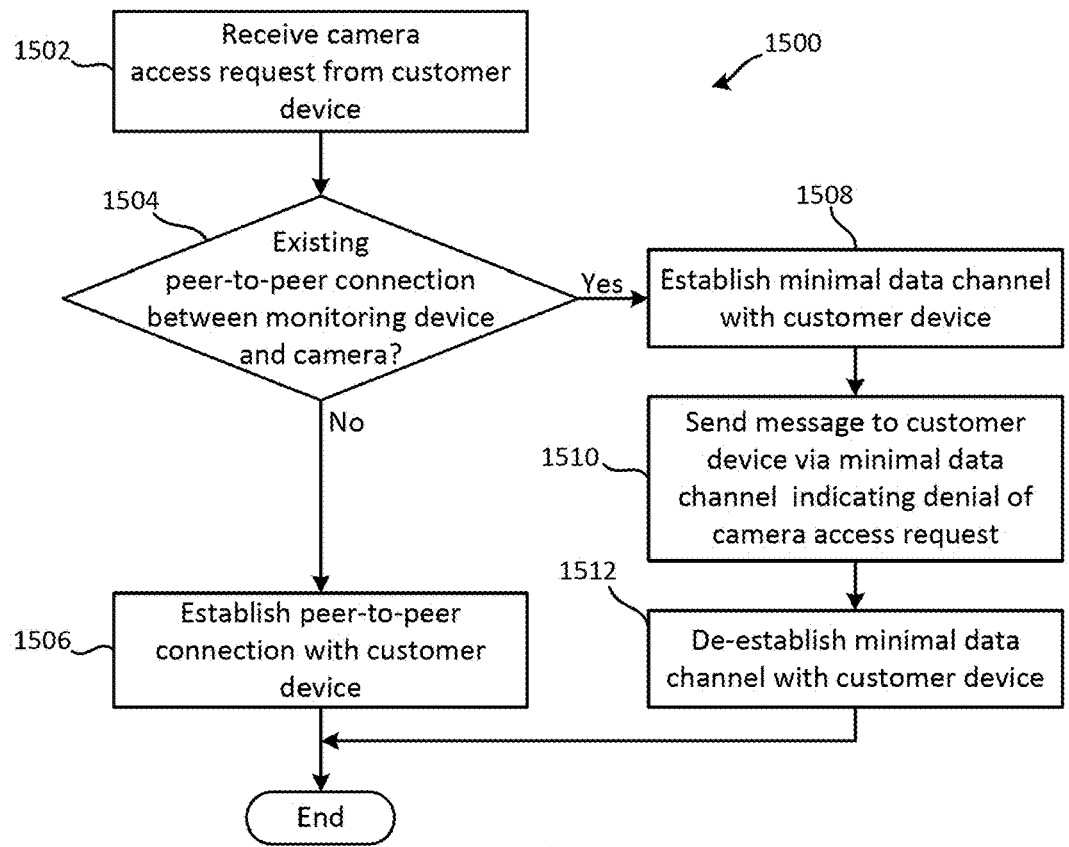
FIG. 15 is a flow chart showing a second example routine that may be executed by a camera of the of the security system shown in FIG. 6, according to some implementations of the present disclosure.

As noted above, providing a monitoring agent 104 with exclusive access to one or more cameras 604 at a monitored location 602 (or at least precluding access to such camera(s) by the customer) may be advantageous because doing can both (A) ensure a high-quality connection with the camera(s) 604, and (B) enable the monitoring agent 104 to take control of the situation without interference from the customer 302, such as by engaging in two-way communication with one or more suspicious individuals (e.g., via a microphone and speaker) in the vicinity of the camera(s) 604. FIGS. 14 and 15 show two example routines 1400 and 1500 that may be performed by a camera 604 to provide a monitoring agent 104 with exclusive access to a camera 604, as well as to apprise a customer (via a customer application 634) that the monitoring agent 104 has been given such exclusive access (e.g., as described above in connection with FIGS. 4 and 5). In particular, the routine 1400 may be performed by the camera 604 in response to receipt of a peer-to-peer connection request originated by a monitoring application 632, and the routine 1500 may be performed by the camera 604 in response to receipt of a peer-to-peer connection request originated by a customer application 634. In some implementations, a processor 902 (see FIG. 9) of the camera 604 may execute instructions embodied by code 910 to cause the camera 604 to perform the operations of the routines 1400 and 1500.

The routine 1400 shown in FIG. 14 will now be described. As shown, the routine 1400 may begin at a step 1402, at which a camera 604 may receive a request from a monitoring device 1016 to access the camera 604. In some implementations, for example, the step 1402 may correspond to the camera 604 receiving an SDP offer from a WebRTC signaling channel provided by the camera streaming service 1042, where such offer was initiated by a monitoring application 632 using access credentials provided by the camera streaming service 1042, as described above in connection with FIGS. 12 and 13.

At a step 1404 of the routine 1400, the camera 604 may establish a peer-to-peer connection with the monitoring device 1016. For example, as described above in connection with FIG. 13, upon identifying suitable ICE candidates, one or more peer-to-peer connections may be established between the monitoring application 632 and the camera(s) 604, thus enabling the streaming of video data from the camera(s) 604 to the monitoring application 632 and/or the exchange of audio data between the monitoring application 632 and the camera(s) 604.

At a decision 1406 of the routine 1400, the camera 604 may determine whether a peer-to-peer connection also exists between a customer device 624 and the camera 604. In some implementations, for example, the camera 604 may determine whether another WebRTC peer-to-peer connection has also been established between the camera 604 and a customer application 634 accessed by a customer device 624, e.g., using the process described above in connection with FIGS. 12 and 13.

When, at the decision 1406, the camera 604 determines that another peer-to-peer connection does not exist between a customer device 624 and the camera 604, the routine 1400 may terminate. When, on the other hand, the camera 604 determines (at the decision 1406) that another peer-to-peer connection does exist between a customer device 624 and the camera 604, the routine 1400 may instead proceed to a step 1408, at which the camera 604 may use the existing peer-to-peer connection between the camera 604 and the customer device 624 to send a message to the customer device 624 (e.g., to the customer application 634) indicating that the existing peer-to-peer connection is about to be terminated. In some implementations, in response to receiving such a message, the customer application 634 may cause the customer device 624 to display a message 402 indicating that the monitoring agent 104 has taken over the camera feed, e.g., as described above in connection with FIG. 4.

At a step 1410 of the routine 1400, the camera 604 may de-establish the peer-to-peer connection with the customer device 624, thus providing the monitoring agent 104 exclusive access to the camera 604 via the monitoring application 632 of the monitoring device 1016 that monitoring agent 104 is operating.

The routine 1500 shown in FIG. 15 will now be described. As shown, the routine 1500 may begin at a step 1502, at which a camera 604 may receive an access request from a customer device 624. In some implementations, for example, the step 1502 may correspond to the camera 604 receiving an SDP offer from a WebRTC signaling channel provided by the camera streaming service 1042, where such offer was initiated by a customer application 634 using access credentials provided by the camera streaming service 1042, as described above in connection with FIGS. 12 and 13.

At a decision 1504 of the routine 1500, the camera 604 may determine whether a peer-to-peer connection already exists between a monitoring device 1016 and the camera 604. In some implementations, for example, the camera 604 may determine whether another WebRTC peer-to-peer connection has already been established between the camera 604 and a monitoring application 632 accessed by a monitoring device 1016, e.g., using the process described above in connection with FIGS. 12 and 13.

When, at the decision 1504, the camera 604 determines that a peer-to-peer connection does not already exist between a monitoring device 1016 and the camera 604, the routine 1400 may proceed to a step 1506, at which the camera 604 may establish a peer-to-peer connection with the customer device 624. For example, as described above in connection with FIG. 13, upon identifying suitable ICE candidates, one or more peer-to-peer connections may be established between the customer application 634 and the camera(s) 604, thus enabling the streaming of video data from the camera(s) 604 to the customer application 634 and/or the exchange of audio data between the customer application 634 and the camera(s) 604.

When, on the other hand, the camera 604 determines (at the decision 1504) that a peer-to-peer connection does already exist between a monitoring device 1016 and the camera 604, the routine 1500 may instead proceed to a step 1508, at which the camera 604 may establish a peer-to-peer connection with the customer device 624 to provide a minimal set of channels through which the camera 604 can send one or more messages to the customer device 624. For example, as described above in connection with FIG. 12, upon identifying suitable interactive connectivity establishment (ICE) candidates, a minimal WebRTC connection may be established between the customer application 634 and the camera(s) 604.

At a step 1510 of the routine 1500, the camera 604 may use the established data channel between the camera 604 and the customer device 624 to send a message 502 to the customer device 624 (e.g., to the customer application 634) indicating that the request to access the camera 604 has been denied. In some implementations, in response to receiving such a message, the customer application 634 may cause the customer device 624 to display a message 502 indicating that a live stream with that camera 604 cannot be provided because a monitoring agent 104 is currently using the camera 604, e.g., as described above in connection with FIG. 5.

At a step 1512 of the routine 1500, the camera 604 may de-establish the peer-to-peer connection that was used to provide the minimal set of data channels with the customer device 624.

Figure 16:
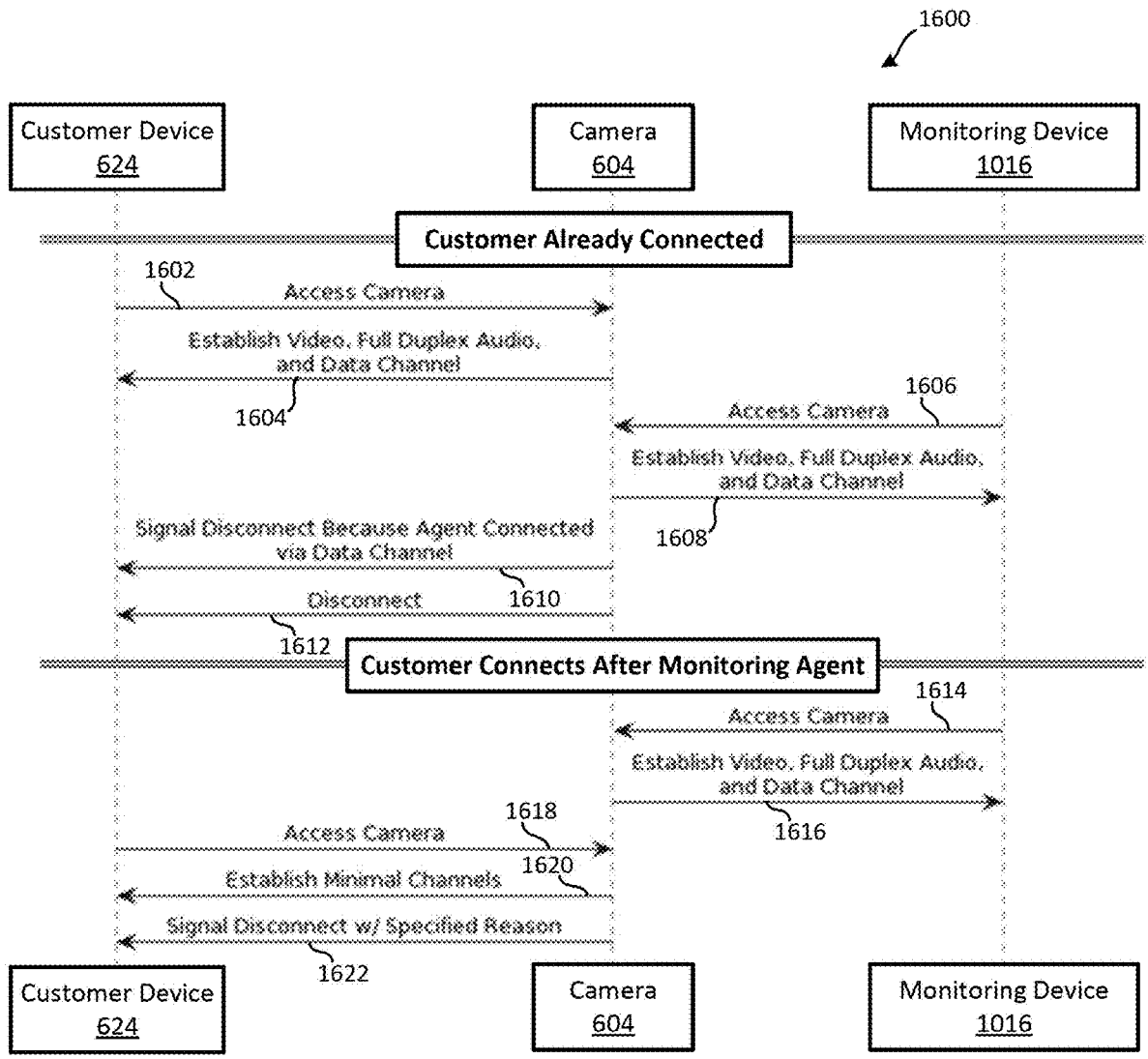
FIG. 16 is a sequence diagram showing interactions that may take place among a customer device, a camera, and a monitoring device of the security system shown in FIG. 6 when the routines shown in FIGS. 14 and 15 are executed by the camera, according to some implementations of the present disclosure.

FIG. 16 is a sequence diagram 1600 illustrating interactions that may take place among the customer device 624, the camera 604, and the monitoring device 1016 when the routines 1400 and 1500 are executed by the camera 604, as described below in connection with FIGS. 14 and 15, respectively. In particular, the top portion of the sequence diagram 1600 illustrates component interactions in a scenario corresponding to the routine 1400 in which a customer device 624 is already connected to the camera 604 when monitoring device 1016 makes a request to access the camera 604, and the bottom portion of the sequence diagram 1600 illustrates component interactions in a scenario corresponding to the routine 1500 in which a customer device 624 makes a request to access the camera 604 when a monitoring device 1016 is already connected to the camera 604.

With respect to the top portion of the sequence diagram 1600, operations 1602 and 1604 may correspond, respectively, to the steps 1502 and 1506 of the routine 1500. Operations 1606 and 1608 of the sequence diagram 1600 may correspond, respectively, to the steps 1402 and 1404 of the routine 1400. Operations 1610 and 1612 of the sequence diagram 1600 may correspond, respectively, to the steps 1408 and 1410 of the routine 1400.

With respect to the bottom portion of the sequence diagram 1600, operations 1614 and 1616 of the sequence diagram 1600 may correspond, respectively, to the steps 1402 and 1404 of the routine 1400. Operations 1618, 1620, and 1622 of the sequence diagram 1600 may correspond, respectively, to the steps 1502, 1508, and 1510 of the routine 1500.

Figure 17:
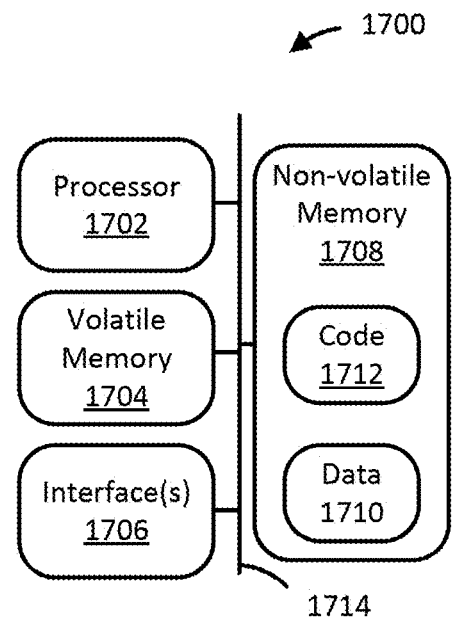
FIG. 17 is a schematic diagram of a computing device that may be used to implement a customer device, a monitoring device, and/or one or more of the services of the of the security system shown in FIG. 6, according to some implementations of the present disclosure.

Turning now to FIG. 17, a computing device 1700 is illustrated schematically. As shown in FIG. 17, the computing device 1700 may include at least one processor 1702, volatile memory 1704, one or more interfaces 1706, non-volatile memory 1708, and an interconnection mechanism 1714. The non-volatile memory 1708 may include executable code 1710 and, as illustrated, may additionally include at least one data store 1712.

In some implementations, the non-volatile (non-transitory) memory 1708 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 1710 stored in the non-volatile memory may include an operating system and one or more applications or programs that are configured to execute under control of the operating system. In some implementations, the code 1710 may additionally or alternatively include specialized firmware and embedded software that is executable without dependence upon a commercially available operating system. Regardless of its configuration, execution of the code 1710 may result in manipulated data that may be stored in the data store 1712 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 1702 of the computing device 1700 may be embodied by one or more processors that are configured to execute one or more executable instructions, such as a computer program specified by the code 1710, to control the operations of the computing device 1700. The function, operation, or sequence of operations can be hard coded into the circuitry or soft coded by way of instructions held in a memory device (e.g., the volatile memory 1704) and executed by the circuitry. In some implementations, the processor 1702 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 1710, the processor 1702 may copy the code 1710 from the non-volatile memory 1708 to the volatile memory 1704. In some implementations, the volatile memory 1704 may include one or more static or dynamic random access memory (RAM) chips and/or cache memory (e.g. memory disposed on a silicon die of the processor 1702). Volatile memory 1704 may offer a faster response time than a main memory, such as the non-volatile memory 1708.

Through execution of the code 1710, the processor 1702 may control operation of the interfaces 1706. The interfaces 1706 may include network interfaces. Such network interfaces may include one or more physical interfaces (e.g., a radio, an ethernet port, a USB port, etc.) and a software stack including drivers and/or other code 1710 that is configured to communicate with the one or more physical interfaces to support one or more LAN, PAN, and/or WAN standard communication protocols. Such communication protocols may include, for example, TCP and UDP among others. As such, the network interfaces may enable the computing device 1700 to access and communicate with other computing devices via a computer network.

The interface(s) 1706 may include one or more user interfaces. For instance, in some implementations, the user interface(s) 1706 may include user input and/or output devices (e.g., a keyboard, a mouse, a touchscreen, a display, a speaker, a camera, an accelerometer, a biometric scanner, an environmental sensor, etc.) and a software stack including drivers and/or other code 1710 that is configured to communicate with the user input and/or output devices. As such, the user interface(s) 1706 may enable the computing device 1700 to interact with users to receive input and/or render output. The rendered output may include, for example, one or more GUIs including one or more controls configured to display outputs and/or receive inputs. The received inputs may specify values to be stored in the data store 1712. The displayed outputs may indicate values stored in the data store 1712.

The various features of the computing device 1700 described above may communicate with one another via the interconnection mechanism 1714. In some implementations, the interconnection mechanism 1714 may include a communications bus.

Figure 18:
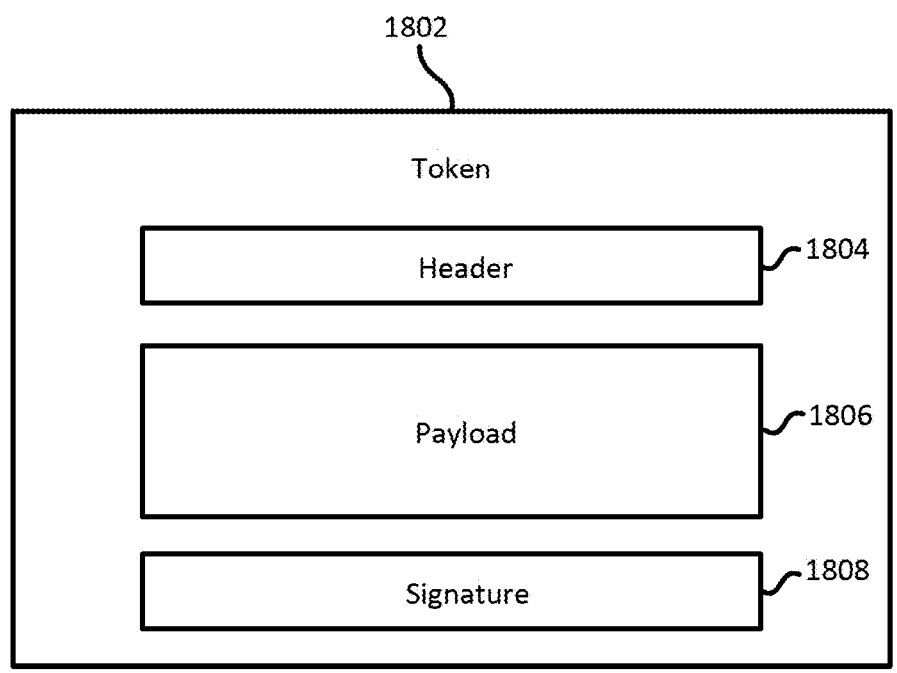
FIG. 18 shows an example token that may be employed by various components of the system disclosed herein, according to some implementations of the present disclosure.

FIG. 18 shows an example token 1802, e.g., a JSON Web Token (JWT), that may be employed by various system components as described above. As illustrated, the token 1802 may include a header 1804, a payload 1806, and a signature 1808. In some implementations, the header 1804 may specify a signing technique that was used to generate the signature 1808 based on the content of the header 1804 and/or the payload 1806, as well as a private key. In some implementations, for example, the specified signing technique may involve (A) combining the base64url encoded header and the base64url encoded payload, (B) hashing the combined base64url value with a hashing technique, e.g., SHA256, and (C) encrypting the determined hash using a private key. As such, by validating the signature 1808 using the private key and the specified signing technique, a recipient device may be able to confirm that the content of a token 1802 it receives from another device has not been altered or otherwise compromised. In some implementations, the header 1804 or payload 1806 of the token 1802 may additionally include an identifier of the device for which it was generated, thus enabling the recipient device to confirm that a received token 1802 came from the same device for which that such token 1802 was originally generated, thus restricting the use of the token 1802 by other devices to which it may have been transferred.

The following paragraphs (M1) through (M14) describe examples of methods that may be performed in accordance with the present disclosure.

(M1) A method may be performed that involves receiving a first request to establish a first connection between a computing device and a camera, wherein the first connection is configured to allow streaming of video data from the camera to the computing device, the computing device is remote from the camera, and the camera is configured to support connections with multiple remote devices at one time; determining that a second connection is already established between an endpoint device and the camera, wherein the endpoint device is remote from the camera, and the second connection is configured to allow streaming of video data from the camera to the endpoint device; and based at least in part on the first request and the second connection already being established, terminating the second connection and establishing the first connection to provide the computing device with access to one or more functionalities of the camera free of interference by the endpoint device.

(M2) A method may be performed as described in paragraph (M1), and may further involve, prior to terminating the second connection, sending a message to the endpoint device indicating that the second connection is going to be terminated.

(M3) A method may be performed as described in paragraph (M1) or paragraph (M2), wherein the method may be performed by an application hosted on the camera.

(M4) A method may be performed as described in any of paragraphs (M1) through (M3), wherein first connection may comprise a first peer-to-peer connection between the computing device and the camera, and the second connection may comprise a second peer-to-peer connection between the endpoint device and the camera.

(M5) A method may be performed as described in any of paragraphs (M1) through (M4), wherein the first connection may be further configured to allow the streaming of audio data from the computing device to the camera.

(M6) A method may be performed as described in any of paragraphs (M1) through (M5), wherein the second connection may be further configured to allow the streaming of audio data from the endpoint device to the camera.

(M7) A method may be performed as described in any of paragraphs (M1) through (M6), wherein the first request may comprise a session description protocol (SDP) offer received from the computing device via a web real-time communication (WebRTC) signaling server, and the method may further involve establishing the first connection comprises sending an SDP answer to the computing device via the WebRTC signaling server.

(M8) A method may be performed that involves receiving a first request to establish a first connection between an endpoint device and a camera, wherein the endpoint device is remote from the camera, and the camera is configured to support connections with multiple remote devices at one time; determining that a second connection is already established between a second computing device and the camera, wherein the second computing device is remote from the camera, and the second connection is configured to allow streaming of video data from the camera to the second computing device; and based at least in part on the first request and the second connection already being established, denying the first request so that the second computing device has access to one or more functionalities of the camera free of interference by the endpoint device.

(M9) A method may be performed as described in paragraph (M8), and may further involve sending a message to the endpoint device that causes the endpoint device to output an indication that the first request has been denied.

(M10) A method may be performed as described in paragraph (M8) or paragraph (M9), wherein the message may be sent via a data channel between the camera and the endpoint device, and the method may further involve establishing the data channel prior to sending the message, and de-establishing the data channel after sending the message.

(M11) A method may be performed as described in any of paragraphs (M8) through (M10), wherein the method may be performed by an application hosted on the camera.

(M12) A method may be performed as described in any of paragraphs (M8) through (M11), wherein first connection may comprise a first peer-to-peer connection between the endpoint device and the camera, and the second connection may comprise a second peer-to-peer connection between the second computing device and the camera.

(M13) A method may be performed as described in any of paragraphs (M8) through (M12), wherein the second connection may be further configured to allow the streaming of audio data from the second computing device to the camera.

(M14) A method may be performed as described in any of paragraphs (M8) through (M13), wherein the first request may comprise a session description protocol (SDP) offer received from the endpoint device via a web real-time communication (WebRTC) signaling server.

The following paragraphs (S1) through (S14) describe examples of apparatuses and/or systems that may be configured in accordance with the present disclosure.

(S1) A system may include at least one processor, and at least one computer-readable medium encoded with instructions which, when executed by the at least one processor, cause the system to receive a first request to establish a first connection between a computing device and a camera, wherein the first connection is configured to allow streaming of video data from the camera to the computing device, the computing device is remote from the camera, and the camera is configured to support connections with multiple remote devices at one time, to determine that a second connection is already established between an endpoint device and the camera, wherein the endpoint device is remote from the camera, and the second connection is configured to allow streaming of video data from the camera to the endpoint device, and to, based at least in part on the first request and the second connection already being established, terminate the second connection and establishing the first connection to provide the computing device with access to one or more functionalities of the camera free of interference by the endpoint device.

(S2) A system may be configured as described in paragraph (S1), wherein the at least one computer-readable medium may be further encoded with additional instructions which, when executed by the at least one processor, further cause the system to, prior to terminating the second connection, send a message to the endpoint device indicating that the second connection is going to be terminated.

(S3) A system may be configured as described in paragraph (S1) or paragraph (S2), wherein the instructions may be included in an application hosted on the camera.

(S4) A system may be configured as described in any of paragraphs (S1) through (S3), wherein first connection may comprise a first peer-to-peer connection between the computing device and the camera, and the second connection may comprise a second peer-to-peer connection between the endpoint device and the camera.

(S5) A system may be configured as described in any of paragraphs (S1) through (S4), wherein the first connection may be further configured to allow the streaming of audio data from the computing device to the camera.

(S6) A system may be configured as described in any of paragraphs (S1) through (S5), wherein the second connection may be further configured to allow the streaming of audio data from the endpoint device to the camera.

(S7) A system may be configured as described in any of paragraphs (S1) through (S6), wherein the first request may comprise a session description protocol (SDP) offer received from the computing device via a web real-time communication (WebRTC) signaling server, and the at least one computer-readable medium may be further encoded with additional instructions which, when executed by the at least one processor, further cause the system to establish the first connection at least in part by sending an SDP answer to the computing device via the WebRTC signaling server.

(S8) A system may include at least one processor, and at least one computer-readable medium encoded with instructions which, when executed by the at least one processor, cause the system to receive a first request to establish a first connection between an endpoint device and a camera, wherein the endpoint device is remote from the camera, and the camera is configured to support connections with multiple remote devices at one time, to determine that a second connection is already established between a second computing device and the camera, wherein the second computing device is remote from the camera, and the second connection is configured to allow streaming of video data from the camera to the second computing device, and to, based at least in part on the first request and the second connection already being established, deny the first request so that the second computing device has access to one or more functionalities of the camera free of interference by the endpoint device.

(S9) A system may be configured as described in paragraph (S8), and the at least one computer-readable medium may be further encoded with additional instructions which, when executed by the at least one processor, further cause the system to send a message to the endpoint device that causes the endpoint device to output an indication that the first request has been denied.

(S10) A system may be configured as described in paragraph (S8) or paragraph (S9), wherein the message may be sent via a data channel between the camera and the endpoint device, and the at least one computer-readable medium may be further encoded with additional instructions which, when executed by the at least one processor, further cause the system to establish the data channel prior to sending the message, and to de-establishing the data channel after sending the message.

(S11) A system may be configured as described in any of paragraphs (S8) through (S10), wherein the instructions may be included in an application hosted on the camera.

(S12) A system may be configured as described in any of paragraphs (S8) through (S11), wherein first connection may comprise a first peer-to-peer connection between the endpoint device and the camera, and the second connection may comprise a second peer-to-peer connection between the second computing device and the camera.

(S13) A system may be configured as described in any of paragraphs (S8) through (S12), wherein the second connection may be further configured to allow the streaming of audio data from the second computing device to the camera.

(S14) A system may be configured as described in any of paragraphs (S8) through (S13), wherein the first request may comprise a session description protocol (SDP) offer received from the endpoint device via a web real-time communication (WebRTC) signaling server.

The following paragraphs (CRM1) through (CRM14) describe examples of computer-readable media that may be configured in accordance with the present disclosure.

(CRM1) At least one non-transitory computer-readable medium may be encoded with instructions which, when executed by at least one processor of a system, cause the system to receive a first request to establish a first connection between a computing device and a camera, wherein the first connection is configured to allow streaming of video data from the camera to the computing device, the computing device is remote from the camera, and the camera is configured to support connections with multiple remote devices at one time, to determine that a second connection is already established between an endpoint device and the camera, wherein the endpoint device is remote from the camera, and the second connection is configured to allow streaming of video data from the camera to the endpoint device, and to, based at least in part on the first request and the second connection already being established, terminate the second connection and establishing the first connection to provide the computing device with access to one or more functionalities of the camera free of interference by the endpoint device.

(CRM2) At least one non-transitory computer-readable medium may be configured as described in paragraph (CRM1), and may be further encoded with additional instructions which, when executed by the at least one processor, further cause the system to, prior to terminating the second connection, send a message to the endpoint device indicating that the second connection is going to be terminated.

(CRM3) At least one non-transitory computer-readable medium may be configured as described in paragraph (CRM1) or paragraph (CRM2), wherein the instructions may be included in an application hosted on the camera.

(CRM4) At least one non-transitory computer-readable medium may be configured as described in any of paragraphs (CRM1) through (CRM3), wherein first connection may comprise a first peer-to-peer connection between the computing device and the camera, and the second connection may comprise a second peer-to-peer connection between the endpoint device and the camera.

(CRM5) At least one non-transitory computer-readable medium may be configured as described in any of paragraphs (CRM1) through (CRM4), wherein the first connection may be further configured to allow the streaming of audio data from the computing device to the camera.

(CRM6) At least one non-transitory computer-readable medium may be configured as described in any of paragraphs (CRM1) through (CRM5), wherein the second connection may be further configured to allow the streaming of audio data from the endpoint device to the camera.

(CRM7) At least one non-transitory computer-readable medium may be configured as described in any of paragraphs (CRM1) through (CRM6), wherein the first request may comprise a session description protocol (SDP) offer received from the computing device via a web real-time communication (WebRTC) signaling server, and the at least one non-transitory computer-readable medium may be further encoded with additional instructions which, when executed by the at least one processor, further cause the system to establish the first connection at least in part by sending an SDP answer to the computing device via the WebRTC signaling server.

(CRM8) At least one non-transitory computer-readable medium may be encoded with instructions which, when executed by at least one processor of a system, cause the system to receive a first request to establish a first connection between an endpoint device and a camera, wherein the endpoint device is remote from the camera, and the camera is configured to support connections with multiple remote devices at one time, to determine that a second connection is already established between a second computing device and the camera, wherein the second computing device is remote from the camera, and the second connection is configured to allow streaming of video data from the camera to the second computing device, and to, based at least in part on the first request and the second connection already being established, deny the first request so that the second computing device has access to one or more functionalities of the camera free of interference by the endpoint device.

(CRM9) At least one non-transitory computer-readable medium may be configured as described in paragraph (CRM8), and may be further encoded with additional instructions which, when executed by the at least one processor, further cause the system to send a message to the endpoint device that causes the endpoint device to output an indication that the first request has been denied.

(CRM10) At least one non-transitory computer-readable medium may be configured as described in paragraph (CRM8) or paragraph (CRM9), wherein the message may be sent via a data channel between the camera and the endpoint device, and the at least one non-transitory computer-readable medium may be further encoded with additional instructions which, when executed by the at least one processor, further cause the system to establish the data channel prior to sending the message, and to de-establishing the data channel after sending the message.

(CRM11) At least one non-transitory computer-readable medium may be configured as described in any of paragraphs (CRM8) through (CRM10), wherein the instructions may be included in an application hosted on the camera.

(CRM12) At least one non-transitory computer-readable medium may be configured as described in any of paragraphs (CRM8) through (CRM11), wherein first connection may comprise a first peer-to-peer connection between the endpoint device and the camera, and the second connection may comprise a second peer-to-peer connection between the second computing device and the camera.

(CRM13) At least one non-transitory computer-readable medium may be configured as described in any of paragraphs (CRM8) through (CRM12), wherein the second connection may be further configured to allow the streaming of audio data from the second computing device to the camera.

(CRM14) At least one non-transitory computer-readable medium may be configured as described in any of paragraphs (CRM8) through (CRM13), wherein the first request may comprise a session description protocol (SDP) offer received from the endpoint device via a web real-time communication (WebRTC) signaling server.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:
  receiving, by a camera, a request to establish a first connection between a first application hosted by a computing device and the camera, wherein the first connection is to be configured to allow streaming of video data from the camera to the computing device, the computing device is remote from the camera, the camera is configured to support connections with multiple remote devices at one time, and the first application is of a first type;
  in response to the camera receiving the request, determining, by the camera, that a second connection is already established between a second application hosted by an endpoint device and the camera, wherein the endpoint device is remote from the camera, the second connection is configured to allow streaming of video data from the camera to the endpoint device, and the second application is of a second type different than the first type; and
  in response to the camera determining that the second connection is already established and based at least in part on the first application being of the first type and the second application being of the second type, terminating, by the camera, the second connection and establishing, by the camera, the first connection to provide the computing device with access to one or more functionalities of the camera free of interference by the endpoint device.

2. The method of claim 1, further comprising:
  prior to terminating the second connection, sending, by the camera, a message to the endpoint device indicating that the second connection is going to be terminated.

3. The method of claim 1, wherein the first connection comprises a first peer-to-peer connection between the computing device and the camera, and the second connection comprises a second peer-to-peer connection between the endpoint device and the camera.

4. The method of claim 1, wherein:
  the first connection is further configured to allow the streaming of audio data from the computing device to the camera.

5. The method of claim 4, wherein:
  the second connection is further configured to allow the streaming of audio data from the endpoint device to the camera.

6. The method of claim 1, wherein:
  the request comprises a session description protocol (SDP) offer received from the computing device via a web real-time communication (WebRTC) signaling server; and
  establishing the first connection comprises sending an SDP answer to the computing device via the WebRTC signaling server.

7. The method of claim 1, wherein the first type of application is configured to be operated by a monitoring agent associated with a security company and the second type of application is configured to be operated by a person associated with a property at which the camera is located.

8. A method, comprising:
  receiving, by a camera, a request to establish a first connection between a first application hosted by an endpoint device and the camera, wherein the endpoint device is remote from the camera, the camera is configured to support connections with multiple remote devices at one time, and the first application is of a first type;
  in response to the camera receiving the request, determining, by the camera, that a second connection is already established between a second application hosted by a computing device and the camera, wherein the computing device is remote from the camera, the second connection is configured to allow streaming of video data from the camera to the computing device, and the second application is of a second type different than the first type; and
  in response to the camera determining that the second connection is already established and based at least in part on the first application being of the first type and the second application being of the second type, denying, by the camera, the request so that the computing device has access to one or more functionalities of the camera free of interference by the endpoint device.

9. The method of claim 8, further comprising:
  sending, by the camera, a message to the endpoint device that causes the endpoint device to output an indication that the request has been denied.

10. The method of claim 9, wherein the message is sent via a data channel between the camera and the endpoint device, and the method further comprises:
  establishing the data channel prior to sending the message; and
  de-establishing the data channel after sending the message.

11. The method of claim 8, wherein first connection comprises a first peer-to-peer connection between the endpoint device and the camera, and the second connection comprises a second peer-to-peer connection between the computing device and the camera.

12. The method of claim 8, wherein:
  the second connection is further configured to allow the streaming of audio data from the computing device to the camera.

13. The method of claim 8, wherein:
  the request comprises a session description protocol (SDP) offer received from the endpoint device via a web real-time communication (WebRTC) signaling server.

14. The method of claim 8, wherein the second type of application is configured to be operated by a monitoring agent associated with a security company and the first type of application is configured to be operated by a person associated with a property at which the camera is located.

15. A camera comprising:
   at least one processor; and
   at least one computer-readable medium encoded with instructions which, when executed by the at least one processor, cause the camera to:
      receive a request to establish a first connection between a first application hosted by a computing device and the camera, wherein the first connection is to be configured to allow streaming of video data from the camera to the computing device, the computing device is remote from the camera, the camera is configured to support connections with multiple remote devices at one time, and the first application is of a first type;
      in response to receiving the request, determine that a second connection is already established between a second application hosted by an endpoint device and the camera, wherein the endpoint device is remote from the camera, the second connection is configured to allow streaming of video data from the camera to the endpoint device, and the second application is of a second type different than the first type; and
      in response to determining that the second connection is already established and based at least in part on the first application being of the first type and the second application being of the second type, terminate the second connection and establish the first connection to provide the computing device with access to one or more functionalities of the camera free of interference by the endpoint device.

16. The camera of claim 15, wherein the at least one computer-readable medium is further encoded with additional instructions which, when executed by the at least one processor, further cause the camera to:
   prior to terminating the second connection, send a message to the endpoint device indicating that the second connection is going to be terminated.

17. The camera of claim 15, wherein first connection comprises a first peer-to-peer connection between the computing device and the camera, and the second connection comprises a second peer-to-peer connection between the endpoint device and the camera.

18. The camera of claim 15, wherein:
   the first connection is further configured to allow the streaming of audio data from the computing device to the camera.

19. The camera of claim 15, wherein the request comprises a session description protocol (SDP) offer received from the computing device via a web real-time communication (WebRTC) signaling server, and the at least one computer-readable medium is further encoded with additional instructions which, when executed by the at least one processor, further cause the camera to:
   establish the first connection at least in part by sending an SDP answer to the computing device via the WebRTC signaling server.

20. The camera of claim 15, wherein the first type of application is configured to be operated by a monitoring agent associated with a security company and the second type of application is configured to be operated by a person associated with a property at which the camera is located.

* * * * *